US007881672B2

(12) United States Patent
Kaiki et al.

(10) Patent No.: US 7,881,672 B2
(45) Date of Patent: Feb. 1, 2011

(54) TUNER, DIGITAL DEMODULATING APPARATUS, CONTROLLING METHOD OF THE APPARATUS, COMPUTER PROGRAM PRODUCT FOR THE APPARATUS, RECORDING MEDIUM RECORDING THEREON THE PRODUCT, AND DIGITAL RECEIVER

(75) Inventors: Nobuyoshi Kaiki, Nara (JP); Takae Sakai, Yao (JP); Masayuki Natsumi, Hiroshima (JP); Kazumasa Kioi, Higashihiroshima (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 955 days.

(21) Appl. No.: 11/654,579

(22) Filed: Jan. 18, 2007

(65) Prior Publication Data

US 2007/0275680 A1 Nov. 29, 2007

(30) Foreign Application Priority Data

May 29, 2006 (JP) ............................. 2006-148729
Sep. 12, 2006 (JP) ............................. 2006-246344

(51) Int. Cl.
*H04B 17/00* (2006.01)

(52) U.S. Cl. .............. 455/67.11; 455/67.13; 455/67.14; 455/114.2; 455/115.1; 455/127.1; 455/127.5; 455/343.2; 375/224; 375/227; 375/231; 375/346; 370/317; 370/318

(58) Field of Classification Search ... 455/67.11–67.16, 455/67.7, 226.1–226.4, 115.1–115.3, 231, 455/127.1–127.5, 343.1–343.6, 501, 513, 455/63.1, 570, 114.2, 222, 278.1, 283, 296; 370/317, 318; 375/224–228, 346, 231
See application file for complete search history.

(56) References Cited

U.S. PATENT DOCUMENTS 6,957,052 B2 * 10/2005 Kuehn ..................... 455/114.3
7,418,032 B2 * 8/2008 Carballo et al. ............ 375/227

FOREIGN PATENT DOCUMENTS

| JP | 10-41834 A | 2/1998 |
| JP | 11-298343 A | 10/1999 |
| JP | 2001-16121 A | 1/2001 |
| JP | 2001-292037 A | 10/2001 |
| JP | 2004-363743 A | 12/2004 |

* cited by examiner

*Primary Examiner*—Edward Urban
*Assistant Examiner*—Junpeng Chen
(74) *Attorney, Agent, or Firm*—Birch, Stewart, Kolasch & Birch, LLP

(57) ABSTRACT

A digital demodulating apparatus comprises a tuner constituted by circuit elements to perform channel select processing to a signal; a demodulator that performs demodulation processing to a signal output from the tuner; a power supply unit that supplies a normal power to each circuit element, and supplies to the circuit element a test power different from the normal power, over a first time period in place of the normal power; a test noise measuring unit that measures the intensity of test noise contained in a signal to be output from the tuner, when the power supply unit supplies the test power over the first time period; a comparing unit that compares the intensity of the test noise measured by the test noise measuring unit with a noise reference value as a reference for updating of the normal power; and a power updating unit that updates the intensity of the normal power on the basis of a result of the comparison by the comparing unit.

32 Claims, 22 Drawing Sheets

TUNER, DIGITAL DEMODULATING APPARATUS, CONTROLLING METHOD OF THE APPARATUS, COMPUTER PROGRAM PRODUCT FOR THE APPARATUS, RECORDING MEDIUM RECORDING THEREON THE PRODUCT, AND DIGITAL RECEIVER

BACKGROUND OF THE INVENTION

1. Field of the Invention

The present invention relates to a tuner, a digital demodulating apparatus, a controlling method of the apparatus, a computer program product for the apparatus, a recording medium recording thereon the product, and a digital receiver.

2. Description of Related Art

In a tuner that performs channel select processing to a signal received through an antenna or the like, an output signal from a circuit element constituting the tuner contains various kinds of noises. The noises contained in the output signal from the circuit element includes noise caused by an interfering wave that has been mixed in the signal when the signal is received by the antenna or the like; and noise caused by thermal noise of the circuit element. On the other hand, a change in electric power supplied to the circuit element brings about changes in intensity of the noises. For example, when the power supplied to the circuit element decreases, in general, the noise caused by the interfering wave increases rapidly. Too much increase in the noise brings about an inconvenience that information contained in the received signal can not accurately be obtained. Therefore, when such an interfering wave exists, electric power of an intensity more than that when no interfering wave exists must be supplied to the circuit element in order to suppress the intensity of the noise.

JP-A-2001-292037 discloses a technique in which supply of electric power to a circuit element is controlled synchronously with timings at which signals are transmitted from a portable mobile phone device. When the device transmits a signal, the signal is received by an antenna of the device itself. Thus, when a signal is transmitted, the transmitted signal is mixed in a received signal as an interfering wave. According to the technique of JP-A-2001-292037, when the device is transmitting a signal, the circuit element is supplied with electric power of an intensity in the degree that the noise caused by the transmitted signal brings about no inconvenience. Contrastingly, when the device is transmitting no signal, the circuit element is supplied with electric power of an intensity less than that when the device is transmitting a signal. Thereby, the intensity of noise to be mixed in the output signal from the circuit element due to the interfering wave can be suppressed, and the power consumption of the circuit element can be suppressed.

However, the intensity of noise caused by an interfering wave also depends on the intensity of the interfering wave. Therefore, the control according to JP-A-2001-292037 can be effective only when it can be estimated what degree of intensity of the interfering wave is mixed in the received signal. On the other hand, mixing an interfering wave in a received signal occurs not only when the device itself transmits a signal. For example, a signal transmitted another device near the device in question may be mixed in a received signal as an interfering wave. That is, it is impossible to always accurately estimate what degree of intensity of the interfering wave to be mixed. Therefore, in order that noise caused by any interfering wave is prevented from bringing about inconvenience, the circuit element must be always supplied with electric power of an intensity more than that required when any interfering wave does not exist. However, the intensity of electric power required for preventing inconvenience caused by any interfering wave is considerably large. This brings about too much increase in the power consumption of the tuner.

Therefore, it is important that the intensity of electric power to be supplied is controlled in accordance with reception conditions so that signal reception is made possible under various reception conditions, such as existence of an interfering wave, and the intensity of electric power to be supplied does not increase more than necessity.

SUMMARY OF THE INVENTION

An object of the present invention is to provide a tuner, a digital demodulating apparatus, a controlling method of the apparatus, a computer program product for the apparatus, a recording medium recording thereon the product, and a digital receiver, wherein the intensity of electric power to be supplied is controlled in accordance with reception conditions.

A tuner according to the present invention performs channel select processing to a signal. The tuner comprises a plurality of circuit elements; a power supply unit that supplies a normal power to each circuit element, and supplies to the circuit element a test power different from the normal power, over a first time period in place of the normal power; a test noise measuring unit that measures the intensity of test noise contained in a signal after channel select processing to be output from the tuner, when the power supply unit supplies the test power over the first time period; a comparing unit that compares the intensity of the test noise measured by the test noise measuring unit with a noise reference value as a reference for update of the normal power; and a power updating unit that updates the intensity of the normal power on the basis of a result of the comparison by the comparing unit.

A digital demodulating apparatus according to the present invention comprises a tuner constituted by a plurality of circuit elements to perform channel select processing to a signal; a demodulator that performs demodulation processing to a signal output from the tuner; a power supply unit that supplies a normal power to each circuit element, and supplies to the circuit element a test power different from the normal power, over a first time period in place of the normal power; a test noise measuring unit that measures the intensity of test noise contained in a signal to be output from the tuner, when the power supply unit supplies the test power over the first time period; a comparing unit that compares the intensity of the test noise measured by the test noise measuring unit with a noise reference value as a reference for updating of the normal power; and a power updating unit that updates the intensity of the normal power on the basis of a result of the comparison by the comparing unit.

A digital receiver according to the present invention comprises the above digital demodulating apparatus; and a reproduction processing unit that performs processing for reproducing at least one of characters, an image, a sound, and a data item, on the basis of a received signal from the digital demodulating apparatus.

According to the present invention, a method of supplying a power to a digital demodulating apparatus comprising a tuner constituted by a plurality of circuit elements to perform channel select processing, and a demodulator that performs demodulation processing to a signal output from the tuner, comprises a power supply step of supplying a normal power to each circuit element, and supplying to the circuit element a test power different from the normal power, over a first time period in place of the normal power; a test noise measuring step of measuring the intensity of test noise contained in a signal to be output from the tuner, when the test power is supplied over the first time period in the power supply step; a comparing step of comparing the intensity of the test noise measured in the test noise measuring step with a noise reference value as a reference for updating of the normal power; and an power updating step of updating the intensity of the normal power on the basis of a result of the comparison in the comparing step.

A computer program product according to the present invention is for a digital demodulating apparatus comprising a tuner constituted by a plurality of circuit elements to perform channel select processing, and a demodulator that performs demodulation processing to a signal output from the tuner. The product causes the digital demodulating apparatus to execute a power supply step of supplying a normal power to each circuit element, and supplying to the circuit element a test power different from the normal power, over a first time period in place of the normal power; a test noise measuring step of measuring the intensity of test noise contained in a signal to be output from the tuner, when the test power is supplied over the first time period in the power supply step; a comparing step of comparing the intensity of the test noise measured in the test noise measuring step with a noise reference value as a reference for updating of the normal power; and an power updating step of updating the intensity of the normal power on the basis of a result of the comparison in the comparing step.

A computer-readable recording medium according to the present invention records thereon the above computer program product.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

First Embodiment

Figure 1A:
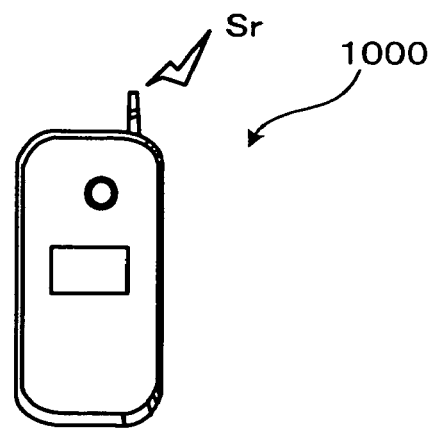
FIG. 1A is a general external view of a cellular phone including therein a digital demodulating apparatus according to an embodiment of the present invention.
Figure 1B:
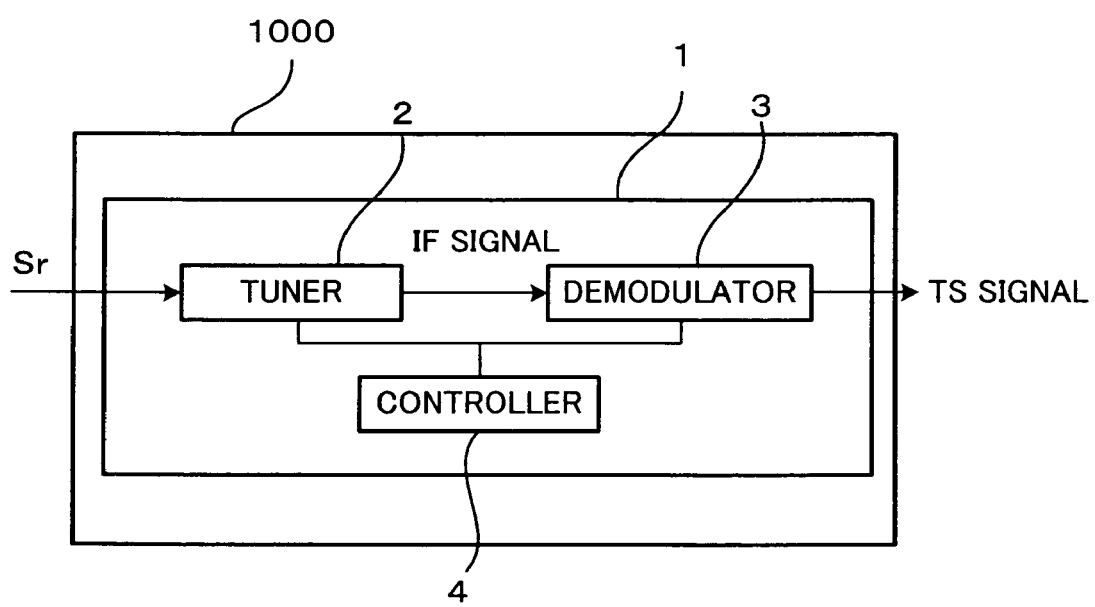
FIG. 1B is a block diagram showing a general construction of the digital demodulating apparatus according to the embodiment.

A digital demodulating apparatus according to a first embodiment of the present invention will be described below. FIGS. 1A and 1B show a cellular phone 1000 according to the first embodiment and a general construction of a digital demodulating apparatus 1 included in the cellular phone 1000, respectively.

The cellular phone 1000 as a digital receiver includes therein the digital demodulating apparatus 1. A signal Sr received by the cellular phone 1000 through its antenna is demodulated by the digital demodulating apparatus 1. Information on data of characters, an image, sound, a program, or the like, is taken out from a demodulated signal output from the digital demodulating apparatus 1, to reproduce the data of the characters, image, sound, program, or the like. The reproduced characters, image, sound, or the like, is provided to a user of the cellular phone 1000 through a not-shown display and a not-shown speaker provided on the phone 1000. Note that the digital demodulating apparatus 1 may be adopted in another digital receiver than such a cellular phone, for example, a digital television receiver, a wireless LAN device, or a personal computer using wireless LAN.

The digital demodulating apparatus 1 includes therein a tuner 2, a demodulator 3, and a controller 4. The tuner 2 is electrically connected to the demodulator 3. The tuner 2 is also electrically connected to an antenna to receive a signal through the antenna. The tuner 2 performs channel select processing to the received signal Sr; then converts the signal Sr into an intermediate frequency (IF) signal; and then sends the IF signal to the demodulator 3. The demodulator 3 receives the IF signal sent from the tuner 2; then generates from the IF signal a demodulated signal, for example, a so-called transport stream (TS) signal; and then outputs the demodulated signal.

The digital demodulating apparatus is constituted by a number of circuit elements. In the below description, if not otherwise specified, each circuit element may be made up of a group of circuit units each of which is specialized so as to carry out an independent function; or may be realized by general-purpose CPU, RAM, and so on, and a computer program that causes the CPU to operate so as to carry out each function as will be described below. In the latter case, each circuit element is realized by combining the hardware such as the CPU and so on with the computer program.

<Received Signal>

The received signal received by the cellular phone 1000 will be described. As an example of this embodiment, a case will be described wherein a transmission system according to Japanese digital terrestrial broadcasting is adopted for the transmission of the signal Sr. In this case, the signal Sr received by the tuner 2 is according to the integrated services digital broadcasting-terrestrial (ISDB-T) system. As the transmission method for the ISDB-T system, the orthogonal frequency division multiplexing (OFDM) method is adopted.

For the received signal of the digital demodulating apparatus according to this embodiment, another system than the ISDB-T system may be adopted, such as the digital audio broadcasting (DAB) system, the digital video broadcasting-terrestrial (DVB-T) system, the digital video broadcasting-handheld (DVB-H) system, the digital multimedia broadcasting (DMB) system, or the IEEE802.11a/b/g/n system used for a wireless LAN. Further, the present invention may be applied to equipment with no antenna, such as a cable television system, in which a signal according to the OFDM method is received.

The OFDM method is a transmission method as follows. This method is a multicarrier method in which a number of carrier waves different in frequency are used for data transmission. The carrier waves used in the OFDM method have their wave forms orthogonal to each other. Here, "two waves are orthogonal" means that the value is zero when the functions each representing the amplitude of the wave to time are multiplied by each other and then temporally integrated in an integration region corresponding to one cycle, that is, the inner product of the functions is zero.

Upon data transmission, a modulated signal is generated by superimposing a number of carrier waves that have been modulated, i.e., mapped, in accordance with each value of data to be transmitted. More specifically, data values contained in the data to be transmitted are distributed to different carrier waves in accordance with the order of arrangement of the data values. The carrier waves are modulated, i.e., mapped, in accordance with the distributed data values, and then the modulated carrier waves are superimposed on each other to generate an OFDM signal. In the OFDM method, thus generating an OFDM signal is equivalent to performing inverse Fourier transform. In the below, an effective symbol length means the inverse of a frequency separation of carrier waves used in the OFDM method.

In order to eliminate the influence of delayed waves other than a direct wave, a guard interval is inserted in the modulated signal in which the carrier waves modulated as described above are superimposed. The guard interval is made in the manner that part of one end of the region of each effective symbol length of the modulated signal is copied and inserted to the other end of the region of the effective symbol length. The modulated signal into which the guard interval has been inserted, is transmitted as an OFDM signal.

The signal made up of the signal of an effective symbol length and a guard interval is referred to as one symbol. The OFDM signal is constructed as a series of a number of symbols. When a signal is received in which the OFDM signal and a delayed wave, which reaches the reception side with being delayed in time, are superimposed, different symbols overlap each other in the received signal. The guard interval is used for taking out from the received signal a portion where no different symbols overlap, when the OFDM signal is received with a delayed wave being superimposed.

In digital terrestrial broadcasting, coding is performed to the data to be transmitted by the OFDM signal in order to correct errors caused by noise and interfering waves generated in the transmission path. For coding used are Reed-Solomon (RS) coding and Viterbi coding. In the RS coding used in digital terrestrial broadcasting, the later 16 bytes of the data of 204 bytes to be transmitted serve as check bits, and an error of eight bytes of 204 bytes can be corrected at the maximum.

In the Viterbi coding, the coding rate k/n is standardized to ½ to ⅞ where n represents the number of bits of coded data to be transmitted and k represents the number of bits of data before coding. To restore the data that has been RS-coded and Viterbi-coded, RS decoding and Viterbi decoding are performed on the reception side.

In accordance with conditions of a transmission path, there is a case wherein burst error arises in which errors concentrate temporally or in frequency in a transmitted signal. On the other hand, when errors can not be corrected after Viterbi decoding to restore a Viterbi-coded signal, in general, there are many cases wherein burst error arises. When errors generated in a signal of a certain length are to be corrected by an error correction method using RS decoding, there is a limit in the number of errors that can be corrected in the signal of the length. Therefore, if the burst error as described above arises, there may be a case wherein error correction is impossible.

In digital terrestrial broadcasting, various kinds of interleave processing are performed to data to be transmitted by transmitted signals, in order to make error correction possible even if burst errors arise in the transmitted signals. As the interleave processing, there are known bit interleave processing, byte interleave processing, time interleave processing, and frequency interleave processing. The interleave processing as described above is to rearrange temporally or in frequency, data corresponding to signals included in a transmitted signal. In particular, time interleave processing is used for temporally rearranging a number of signals successive temporally. Frequency interleave processing is used for rearranging at random in frequency, a number of carrier waves continuous in frequency. For example, time interleave processing and time deinterleave processing for restoring time-interleaved data, are performed as follows.

Figure 2:
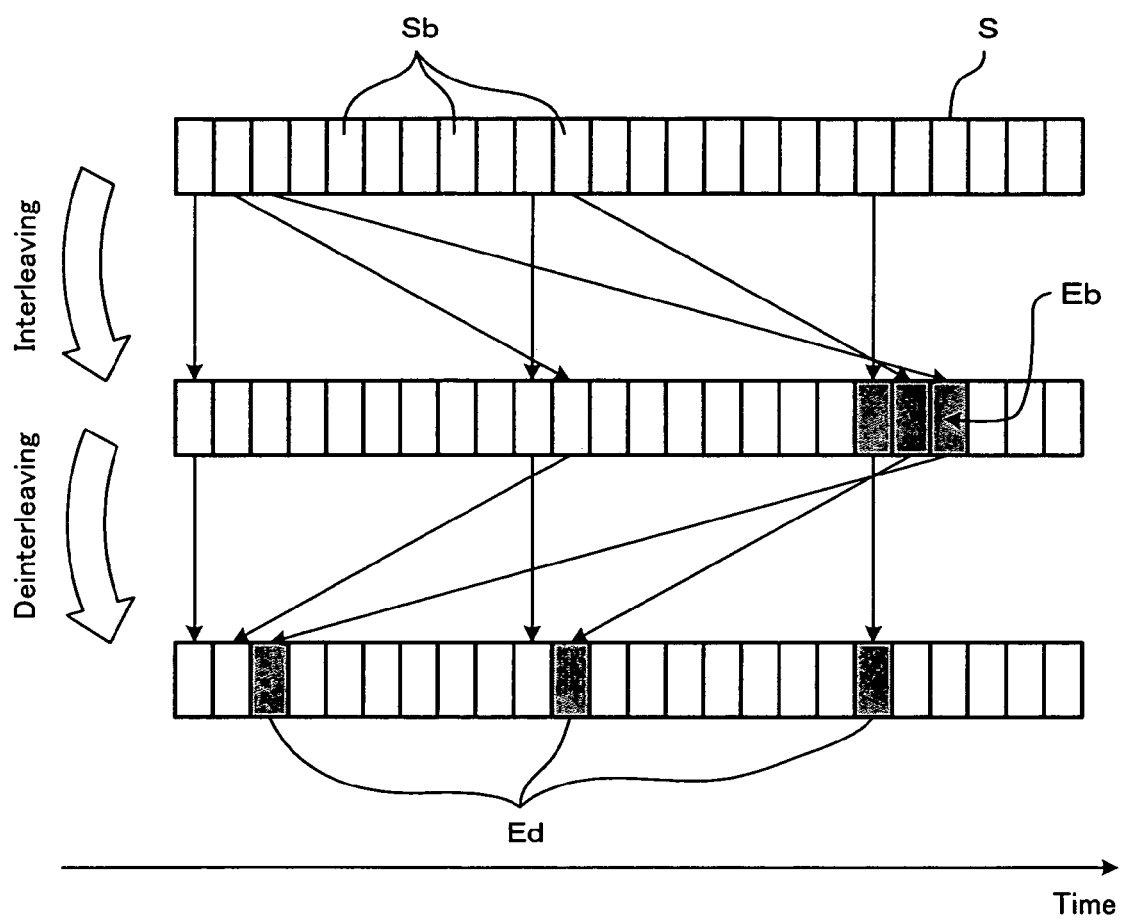
FIG. 2 is a representation for explaining interleaving and deinterleaving applied to a signal received by the cellular phone of FIG. 1.

FIG. 2 is a representation showing an example of time interleave and deinterleave processing. FIG. 2 shows three signals before and after interleave and deinterleave processing. As shown in FIG. 2, each signal is constituted by a number of symbols Sb successive temporally.

An OFDM signal S constituted by a number of modulated carrier waves is rearranged by time interleave processing in a predetermined order in a unit of data corresponding to the length of each symbol Sb, as shown in FIG. 2. When the signal corresponding to the data thus rearranged is transmitted, a burst error Eb arises in part of the signal in accordance with conditions of the transmission path. After receiving the signal, time deinterleave processing is performed on the reception side. Data once rearranged by time interleave processing is restored to its original order by time deinterleave processing. By this, the burst error Eb having arisen over a number of symbols in the transmission path is dispersed to errors Ed of the respective symbols by time deinterleave processing.

As shown in FIG. 2, rearranging is performed by time interleave processing such that each symbol is shifted to a position temporally later than its original position before time interleave processing. In addition, signals of symbols included in carrier waves different in frequency are included in temporally different positions in the signal after rearrangement, respectively.

As described above, even when a burst error arises in which errors concentrate temporally, error correction is possible because the errors are dispersed after time deinterleave processing.

In byte interleave processing, a signal is rearranged in a unit of byte such that data is dispersed in a unit of 204 bytes of RS coding. In bit interleave processing, a signal is rearranged in a unit of bit. In frequency interleave processing, symbols are rearranged over carrier waves included in an OFDM signal.

In digital terrestrial broadcasting, in addition to the above, energy dispersal processing is performed to prevent energy bias in a transmitted signal due to data bias. The energy dispersal processing is performed by implementing an exclusive OR operation in a unit of bit between pseudorandom data and data according to the transmitted signal to make data random.

<Tuner>

Figure 3A:
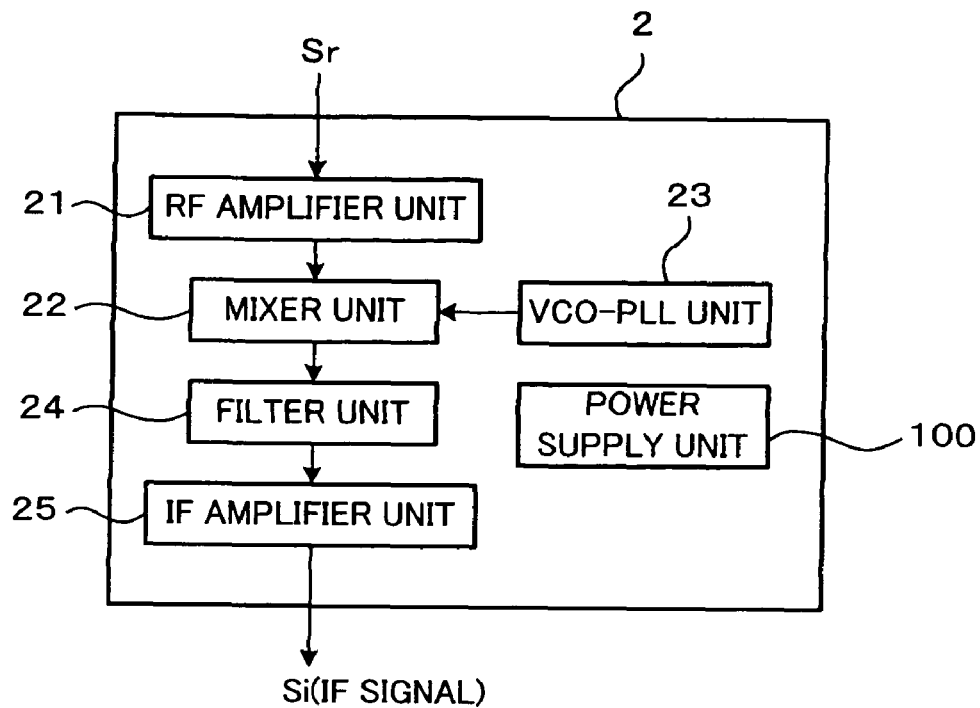
FIG. 3A is a block diagram showing a construction of a tuner shown in FIG. 1B.

The tuner 2 will be described below. FIG. 3A is a block diagram showing a construction of the tuner 2.

The tuner 2 includes therein an RF amplifier unit 21, a mixer unit 22, a VCO-PLL unit 23, a filter unit 24, and an IF amplifier unit 25. The signal Sr input to the tuner 2 is amplified by the RF amplifier unit 21, and then output to the mixer unit 22. The VCO-PLL unit 23 generates a mixing signal based on a frequency corresponding to a specific channel, which is channel select processing. The mixing signal generated by the VCO-PLL unit 23 is output to the mixer unit 22. From the signal Sr output from the RF amplifier unit 21 and the mixing signal output from the VCO-PLL unit 23, the mixer unit 22 generates an IF signal Si according to an IF frequency.

The IF signal generated by the mixer unit 22 is output to the filter unit 24. The filter unit 24 removes unnecessary signal components from the signal Si output from the mixer unit 22. The signal Si from which the unnecessary signal components have been removed, is output to the IF amplifier unit 25. The IF amplifier unit 25 amplifies the signal Si output from the filter unit 24, and then outputs the amplified signal Si to the demodulator 3.

The tuner 2 further includes therein a power supply unit 100. The power supply unit 100 supplies power to each of the RF amplifier unit 21, the mixer unit 22, the filter unit 24, and the IF amplifier unit 25. The RF amplifier unit 21 and so on operate with the respective powers supplied from the power supply unit 100. The power supply unit 100 includes therein a power controlling section 101, a normal power storage section 102, and a test power storage section 103. The normal power storage section 102 and the test power storage section 103 store therein the intensities of powers to be supplied to the RF amplifier unit 21 and so on. Of them, the normal power storage section 102 stores therein the intensities of normal powers to be supplied to the RF amplifier unit 21 and so on. The power controlling section 101 controls the intensities of the powers to be supplied to the RF amplifier unit 21 and so on, to the intensities of the powers stores in one of the normal power storage section 102 and the test power storage section 103. If the power supply unit 100 receives no special instruction from the controller 4, the power supply unit 100 supplies to each circuit element such as the RF amplifier unit 21, the normal power stored in the normal power storage section 102, which is required for normal operation of the circuit element.

When the RF amplifier unit 21 and so on are realized by analogue circuits, the output signal from each analogue circuit contains various kinds of noises. Some of the noises contained in the output signal depends on the intensity of the power supplied to the analogue circuit. That is, the intensity of the noise contained in the signal Si output from the tuner 2 varies in accordance with the intensities of the powers supplied to the RF amplifier unit 21 and so on. On the other hand, if the noise contained in the signal Si output from the tuner 2 exceeds a certain extent when the demodulator 3 demodulates the signal Si, the signal Si may not accurately be demodulated. For this reason, the powers to be supplied to the RF amplifier unit 21 and so on must be controlled so as to have sufficient intensities in the degree that the signal Si can accurately be demodulated.

Thus, the intensities of the normal powers stored in the normal power storage section 102 have been set to power intensities by which the intensity of the noise contained in the signal Si output from the tuner 2 finally falls within a range in which accurate demodulation of the signal Si is possible.

Noises contained in a signal output from an analogue circuit will be described below.

<Noises Contained in Output Signal>

Noises to be generated in a signal output from an analogue circuit mainly include two kinds of noises. One is device noise generated due to thermal noise and so on in the analogue circuit. The device noise includes noise caused by heats generated from resistance elements, the base and emitter resistances of transistors, and the like, included in the analogue circuit. The device noise also includes so-called shot noise generated when charges move through an energy barrier in an analogue circuit that includes therein a positive-negative (PN) junction; and so-called flicker noise generated when charges are trapped at the boundary between an oxide and silicon of a metal-oxide-semiconductor field effect transistor (MOSFET).

The other of the noises to be generated in the output signal is interference noise generated due to mixing in the signal Sr an interfering wave other than a target wave that corresponds to an original signal transmitted from a transmission source, when the cellular phone 1000 receives the signal Sr. The interference noise is as follows. An output signal from an analogue circuit includes therein not only components linear to the input signal but also distortion components non-linear to the input signal. When an interfering wave other than the target wave has been mixed in the input signal, non-linear distortion components corresponding to both of the target wave and the interfering wave appear on the output signal. Of the non-linear components, the component that affects the linear components of the target wave in the output signal is called the interfering noise. A quantitative description of the interference noise will be given below.

When an output signal y(t) is obtained from an input signal x(t) in an analogue circuit, a relation between the signals is given by the following Expression 4. In the Expression 4, alpha$_n$ (n=0, 1, 2, . . . ) represents a coefficient of the n-order component, which indicates a characteristic of the analogue circuit. The alpha$_1$ indicates the gain of the analogue circuit. In general, alpha$_1$ is more than zero and alpha$_3$ is less than zero.

$$y(t)=\alpha_0+\alpha_1 x(t)+\alpha_2 x(t)^2+\alpha_3 x(t)^3+\ldots \quad \text{[Expression 4]}$$

In the Expression 4, the influence of distortions other than the first- and third-order components is little in general. For simplification, the following Expression 5 approximates the relation between the input and output signals only by the first- and third-order components.

$$y(t)=\alpha_1 x(t)+\alpha_3 x(t)^3 \quad \text{[Expression 5]}$$

It is assumed that the input signal is represented by two sine waves. The amplitude and angular velocity of one sine wave are represented by $A_1$ and omega$_1$, respectively; and the amplitude and angular velocity of the other sine wave are represented by $A_2$ and omega$_2$, respectively. The following Expression 6 gives the input signal in this assumption. The relation between the angular velocity omega and the frequency f is given by omega is equal to 2 pi×f. The difference between the angular velocity and the frequency is only 2 pi. In the below description, therefore, the angular velocity and the frequency are treated as the same factor for simplification.

$$x(t)=A_1 \cos \omega_1 t + A_2 \cos \omega_2 t \quad \text{[Expression 6]}$$

By substituting the Expression 6 in the Expression 5, each frequency component in the output signal is obtained as follows. The following Expression 7 is obtained by substituting the Expression 6 in the Expression 5.

$$y(t)=\alpha_1(A_1 \cos \omega_1 t + A_2 \cos \omega_2 t)+\alpha_3(A_1 \cos \omega_1 t + A_2 \cos \omega_2 t)^3 \quad \text{[Expression 7]}$$

By expanding the Expression 7, the following Expression 8 is obtained.

$$y(t) = \alpha_1(A_1\cos\omega_1 t + A_2\cos\omega_2 t) + \\ \alpha_3(A_1^3\cos^3\omega_1 t + 3A_1^2 A_2\cos^2\omega_1 t\cos\omega_2 t) + \\ \alpha_3(3A_1 A_2^2\cos\omega_1 t\cos^2\omega_2 t + A_2^3\cos^3\omega_2 t) \quad \text{[Expression 8]}$$

Further, by expanding the Expression 8, the components whose frequencies correspond to omega$_1$ and ometa$_2$ in the Expression 8 are given by the following Expression 9.

$$\omega_1, \omega_2 : \left(\alpha_1 A_1 + \frac{3}{2}\alpha_3 A_1 A_2^2\right)\cos\omega_1 t + \\ \left(\alpha_1 A_2 + \frac{3}{2}\alpha_3 A_1^2 A_2\right)\cos\omega_2 t \quad \text{[Expression 9]}$$

On the other hand, the component whose frequency corresponds to 2 omega$_1$ plus/minus omega$_2$ is given by the following Expression 10; and the component whose frequency corresponds to omega$_1$ plus/minus 2 omega$_2$ is given by the following Expression 11.

$$2\omega_1 \pm \omega_2 : \left(\frac{3}{4}\alpha_3 A_1^2 A_2\right)\cos(2\omega_1 \pm \omega_2) \quad \text{[Expression 10]}$$

$$\omega_1 \pm 2\omega_2 : \left(\frac{3}{4}\alpha_3 A_1 A_2^2\right)\cos(\omega_1 \pm 2\omega_2) \quad \text{[Expression 11]}$$

Figure 4A:
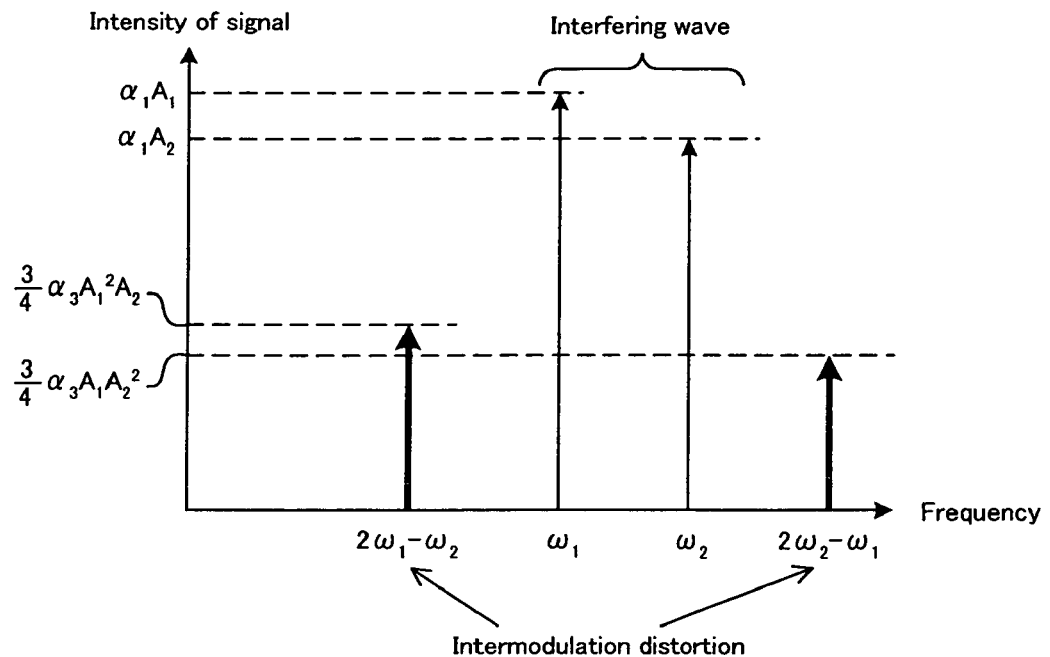
FIG. 4A is a graph for explaining intermodulation distortion to be generated in a circuit element in the tuner shown in FIG. 1B.

It is now assumed that both of the sine waves whose amplitudes are represented by $A_1$ and $A_2$ are interfering waves. In this case, the spectrum of the output signal includes the components given by the Expressions 10 and 11 as the components whose frequencies correspond to 2 omega$_1$-omega$_2$ and omega$_1$-2 omega$_2$. These components are called intermodulation distortions. As apparent from the Expressions 10 and 11, the intensities of the intermodulation distortions are ¾|alpha$_3$|$A_1^2 A_2$ and ¾|alpha$_3$|$A_1 A_2^2$, respectively. FIG. 4A shows such intermodulation distortions included in the spectrum of an output signal. When the frequency of an intermodulation distortion is close to the frequency band of the target wave, the intermodulation distortion acts as noise to interfere in reception of the target wave.

Figure 4B:
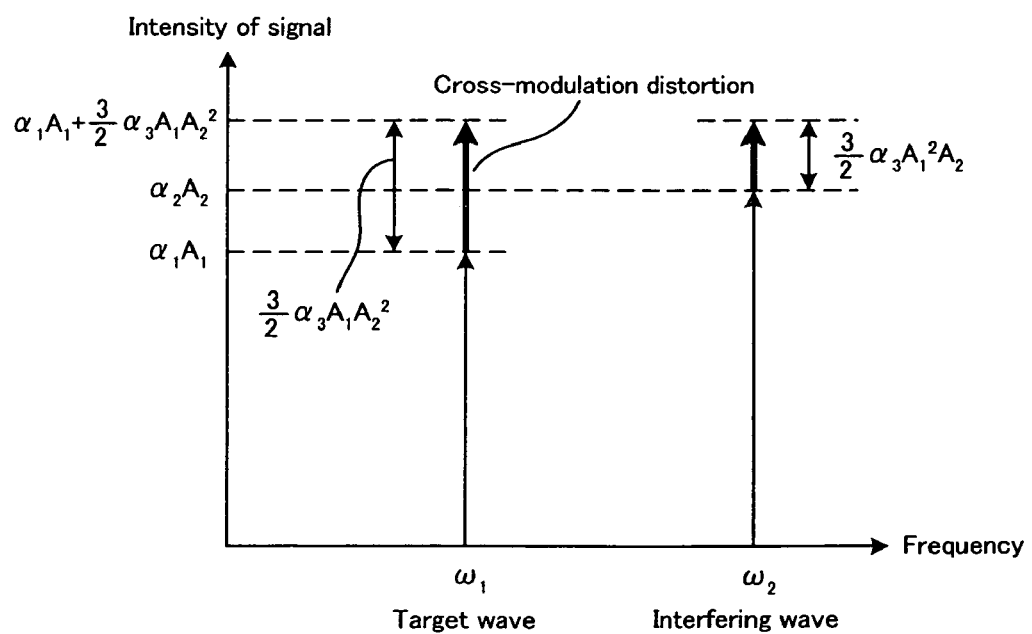
FIG. 4B is a graph for explaining cross-modulation distortion to be generated in the circuit element in the tuner shown in FIG. 1B.

Next, it is assumed that the sine wave whose amplitude is represented by $A_1$ in the Expression 6 is the target wave and the sine wave whose amplitude is represented by $A_2$ is an interfering wave. In this case, the spectrum of the output signal includes the component given by the Expression 9 as the component whose frequency corresponds to $omega_1$, which corresponds to the frequency of the target wave itself. This component is called cross-modulation distortion. As apparent from the Expression 9, the intensity of the cross-modulation distortion is $3/2 |alpha_3| A_1 A_2^2$. FIG. 4B shows such a cross-modulation distortion. When the input signal includes an interfering wave in addition to the target wave, noise due to a cross-modulation distortion is always generated as the frequency component of the target wave itself.

As described above, when the input signal contains an interfering wave in addition to the target wave, interference noise is generated in the frequency band of the target wave due to the non-linearity of the RF amplifier unit 21 and so on, constituting the tuner, and the interfering wave. As a result, the IF signal Si to be output from the tuner contains interference noise.

Figure 5A:
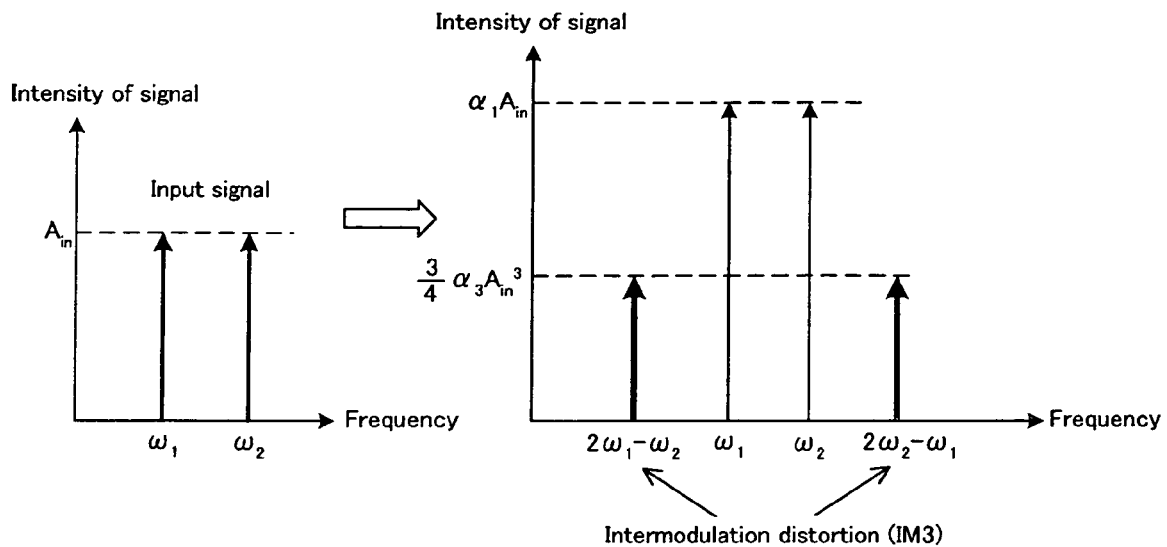
FIG. 5A shows graphs for explaining intermodulation distortion to be generated when two interfering waves exist equal to each other in amplitude.
Figure 5B:
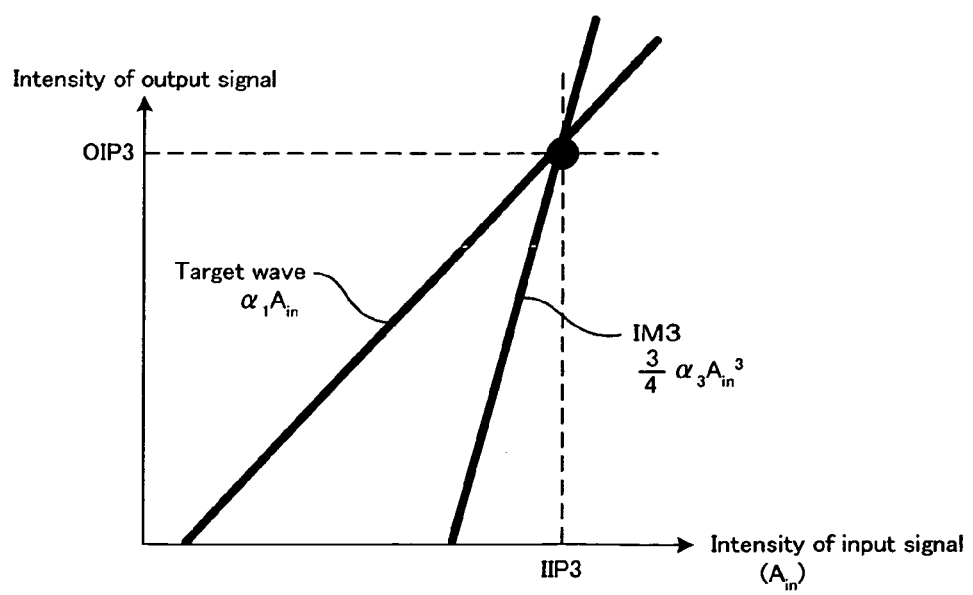
FIG. 5B is a graph for explaining IIP3 and OIP3, which are used as indexes to indicate the third-order non-linearity of an analogue circuit.

The third-order input intercept point IIP3 is generally used as an index to indicate the third-order non-linearity of a group of circuit elements. The index IIP3 will be described below. FIGS. 5A and 5B are graphs for explaining IIP3.

As described above, when two interfering waves are input, intermodulation distortions arise. FIG. 5A shows the spectrum of an output signal of a circuit element group when a signal is input that is constituted by two sine waves whose amplitudes are $A_{in}$ in common and whose frequencies correspond to $omega_1$ and $omega_2$, respectively, where $omega_1$ is not equal to $omega_2$. In the output signal, the components whose frequencies correspond to $omega_1$ and $omega_2$ are output after amplified $alpha_1$ times. These are the first-order components to the input signal. Further, non-linear third-order components in the circuit element group, that is, components due to intermodulation distortions IM3, are output.

FIG. 5B is a graph showing a relation of the amplitude of the target wave to the intensity of the input signal, and a relation of the intensity of the noise due to intermodulation distortion to the intensity of the input signal. The amplitude of the target wave is proportional to the intensity of the input signal. The intermodulation distortion IM3 is proportional to the cube of the intensity of the input signal. The third-order input intercept point IIP3 and the third-order output intercept point OIP3 are defined as the intensities of the respective input and output signals at the point where the amplitude of the target wave, which is in first-order proportion to the input signal, and the intensity of the component due to the intermodulation distortion IM3, which is in third-order proportion to the input signal, intersect with each other. These are used as indexes to indicate the non-linearity of a circuit element group. The amplitude of the target wave in the output signal and the intensity of the component due to the intermodulation distortion are $aplpa_1 A_{in}$ and $3/4 |alpha_3| A_{in}^3$, respectively. Thus, IIP3 is obtained by the following Expression 12.

$$IIP3 = \sqrt{\frac{4\alpha_1}{3|\alpha_3|}}$$ [Expression 12]

Therefore, when two interfering waves either of which has its amplitude of $A_{in}$ are input, the intensity of distortion to be generated due to intermodulation is obtained by the following Expression 13 using IIP3.

$$IM3 = \alpha_1 A_{in}^3 / IIP3^2$$ [Expression 13]

Further, when a target wave having its amplitude of $A_1$ and an interfering wave having its amplitude of $A_2$ are input, the intensity of distortion to be generated in the frequency of the target wave due to cross-modulation is obtained by the following Expression 14 using IIP3.

$$N = 2\alpha_1 A_1 A_2^2 / IIP3_2$$ [Expression 14]

As apparent from the Expressions 13 and 14, the intermodulation distortion is proportional to the cube of the amplitude of the interfering waves; and the cross-modulation distortion is proportional to the square of the amplitude of the interfering wave. Thus, when the amplitude of an interfering wave is large in the degree that the interference noise becomes problematic, the influence of the intermodulation distortion is more considerable than the influence of the cross-modulation distortion. Therefore, the digital demodulating apparatus 1 may be constructed such that only the influence of the intermodulation distortion is taken into consideration when the intermodulation distortion is close to the frequency band of the target wave, and only the influence of the cross-modulation distortion is taken into consideration when the intermodulation distortion is not so close to the frequency band of the target wave.

The noises contained in the output signal from an analogue circuit includes interference noise and device noise generated in the analogue circuit itself, and noises contained in the input signal to the analogue circuit. For example, the input signal to the IF amplifier unit 25 contains noises generated in the RF amplifier unit 21, the mixer unit 22, and the filter unit 24, and further noises in the signal input to the tuner 2. Thus, the output signal from an analogue circuit contains: (1) interference noise generated in the analogue circuit; (2) device noise generated in the analogue circuit; (3) noises generated in another analogue circuit; and (4) noises generated before input to the tuner. The noises of (3) generated in another analogue circuit are constituted by interference noise and device noise generated in the other analogue circuit. When each analogue circuit amplifies its input signal, the noises contained in the input signal are also amplified, and therefore the noises of (3) and (4) are output after amplified.

<Relation Between Noise and Power to be Supplied>

When the noise contained in the signal Si output from the tuner 2 exceeds a certain extent, the demodulator 3 can not accurately demodulate the signal Si. If the signal Si was not accurately demodulated, data of characters, sound, or the like, can not accurately be obtained from the TS signal output from the demodulator 3. To prevent such a situation, the intensity of the power to be supplied to each circuit element of the tuner 2 must be controlled so that the intensity of the noise to be contained in the output signal from the tuner 2 does not exceed a certain value.

Figure 6A:
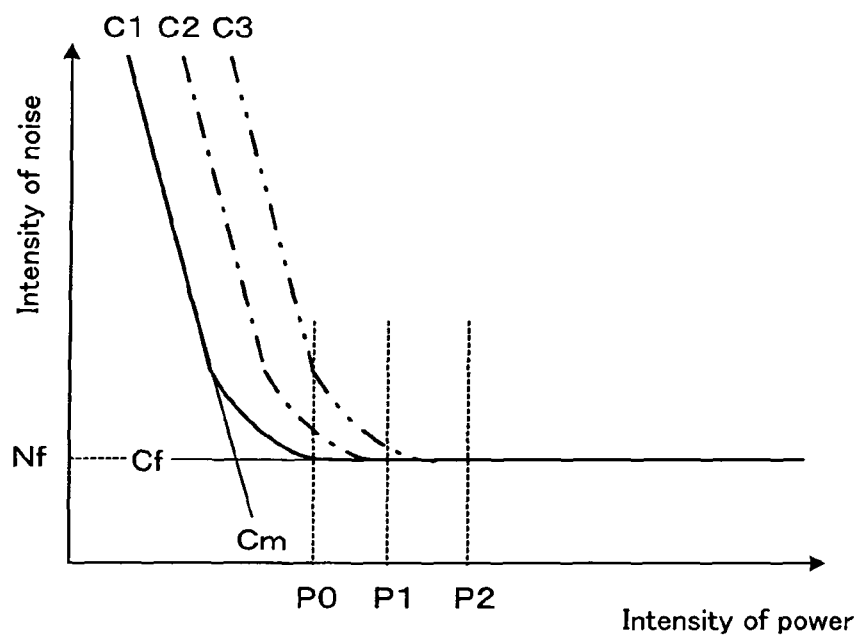
FIG. 6A is a graph showing a relation between the intensity of noise to be contained in an output signal from a circuit element in the tuner shown in FIG. 1B and electric power to be supplied to the circuit element, when noises other than interference noise scarcely change relatively to the power supplied to the circuit element.
Figure 6B:
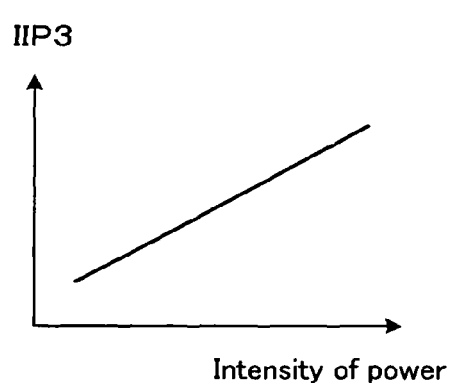
FIG. 6B is a graph showing a relation between IIP3 of the circuit element and the electric power to be supplied to the circuit element.
Figure 6C:
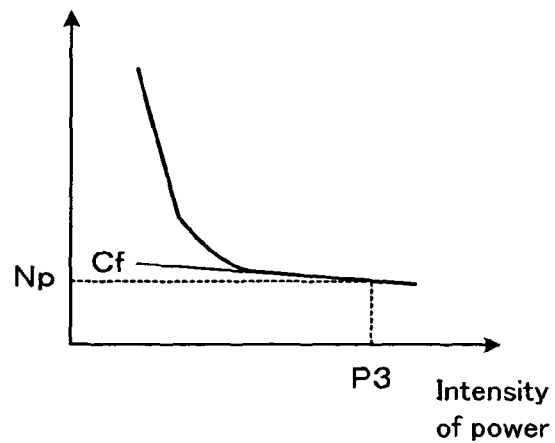
FIG. 6C is a graph showing a relation between the intensity of noise to be contained in the output signal from the circuit element in the tuner shown in FIG. 1B and electric power to be supplied to the circuit element, when noises other than interference noise change relatively to the power supplied to the circuit element.

FIGS. 6A and 6C are graphs each generally showing an example of a relation between the intensity of the noise contained in the output signal from one analogue circuit of the RF amplifier unit 21, the mixer unit 22, the filter unit 24, and the IF amplifier unit 25, and the power to be supplied to the analogue circuit. In the graph of FIG. 6A, the axis of abscissas represents the intensity of the power to be supplied; and the axis of ordinate represents the intensity of the noise. FIG. 6B is a graph generally showing a relation between the intensity of the power to be supplied to an analogue circuit and IIP3 of the analogue circuit. Any of the graphs of FIGS. 6A to 6C is general, in which a logarithmic scale is used on the axis of ordinate to get a rough idea.

In FIG. 6A, a curved line Cf represents an example in which no interference noise exists, and a curved line Cm represents an example in which only interference noise exists. As apparent from the Expressions 13 and 14, the interference noise is inversely proportional to the square of IIP3. In addition, as apparent from FIG. 6B, IIP3 extremely increases as the power to be supplied increases. Therefore, as apparent from the curved line Cm, the intensity of the interference noise sharply increase as the power decreases. On the other hand, a change in the noise other than the interference noise to a change in the power is very little in comparison with a change in the interference noise to a change in the power. Therefore, as shown by the curved line Cf, the intensity of the noise other than the interference noise is considered to be substantially constant to the intensity of the power.

The noise other than the interference noise, shown by the curved line Cf, includes (2) device noise generated in the analogue circuit, (3) noises generated in another analogue circuit, and (4) noises generated before input to the tuner, of the above-described noises of (1) to (4).

A curved line C1 represents a relation of the aggregate noise of the interference noise and the device noise to the intensity of the power. Because the curved lines Cm and Cf have the above-described characteristics, the intensity of the noise shown by the curved line C1 is substantially constant in a region that the power is intense. In the case of the curved line C1, in a region that the power is less than a certain intensity P0, the noise sharply increases as the power decreases. A symbol Nf represents the intensity of the noise contained in the output signal from the circuit element when the circuit element is supplied with the power of an intensity more than the critical power P0 by which the influence of the interference noise scarcely appears on the curved line C1. Because the influence of the interference noise appears if the power to be supplied to the circuit element is less than P0, the power to be supplied to the circuit element must be controlled so as not to be less than P0.

However, as the amplitude of interfering wave varies, curved lines vary that represent the relation between the intensity of the noise and the intensity of the power. For example, if the amplitude $A_{in}$ of interfering wave becomes twice when interfering noise is generated due to intermodulation distortion, the intensity of the interference noise becomes eight times as apparent from the Expression 13. Except for a case wherein the cellular phone 1000 receives directly through its antenna a signal transmitted by the phone itself, in general, it is impossible to accurately estimate what amplitude of interfering wave is mixed in the signal Sr to be input to the tuner 2.

Therefore, the intensity of the power to be supplied to each analogue circuit must be controlled, for example, on the assumption that the amplitude of interfering wave varies within a range of a certain degree. When curved lines that represent the relation between the intensity of the noise and the intensity of the power vary among the curved lines C1, C2, and C3 due to variation of the amplitude of interfering wave, the influence of interference noise may appear on the output signal if the intensity of the power to be supplied is being kept at P0. In order that the demodulator 3 can demodulate the signal Si even if the interfering wave varies thus, the power to be supplied to each analogue circuit must be set to an intensity having a sufficient margin. Therefore, the power to be supplied is kept at a value at which no influence of interfering wave appear on the output signal even if the interference noise varies among the curved lines C1 to C3, for example, P2 in FIG. 6A. That is, the intensity of the normal power is kept so that the intensity of the noise to be contained in the output signal from each circuit element scarcely changes from Nf even when the amplitude of interfering wave varies or operation conditions of the circuit element varies.

As described above, the power to be supplied to each circuit element such as the RF amplifier unit 21 must be set in consideration of a change in interfering wave. In addition, each circuit element has manufacturing variation. Further, the power to be supplied to a circuit element may accidentally vary because of the operation conditions of the tuner 2, or the characteristics of each circuit element may vary in accordance with a change in the operation environment, such as atmospheric temperature.

Thus, in general, the powers to be supplied to the RF amplifier unit 21 and so on are set in consideration of a change in interfering wave, manufacturing variation, variation of the power to be supplied, variation of the operation environment, and so on. More specifically, the intensity of the normal power to be stored in the normal power storage section 102 is set to a value having a sufficient margin. That is, the normal power storage section 102 stores therein a value of the intensity of power for each analogue circuit such as the RF amplifier unit 21, having a sufficient margin, so that the demodulator 3 can accurately demodulate the signal Si even if the interfering wave varies or the operation environment varies. Thereby, even when the relation between the noise and the power to be supplied varies among the curved lines C1 to C3, for example, due to a change in interfering wave, a sufficient power within a range in which accurate demodulation of the signal Si is possible, is supplied to each circuit element such as the RF amplifier unit 21.

In the case of FIG. 6C wherein a change in the noise other than the interference noise can not be ignored to a change in the power to be supplied to each circuit element, the intensity of the normal power is set to a value not less than P3 so that the intensity of the noise to be contained in the output signal from the circuit element is not more than a noise permissible value Np. The noise permissible value Np indicates an intensity of noise that enables the demodulator 3 to accurately demodulate the signal Si. The normal power is set to a value sufficiently more than Np so as to leave demodulation processing untouched, in consideration of a change in interfering wave, manufacturing variation, variation of the power to be supplied, variation of the operation environment, and so on.

<Demodulator>

Figure 7A:
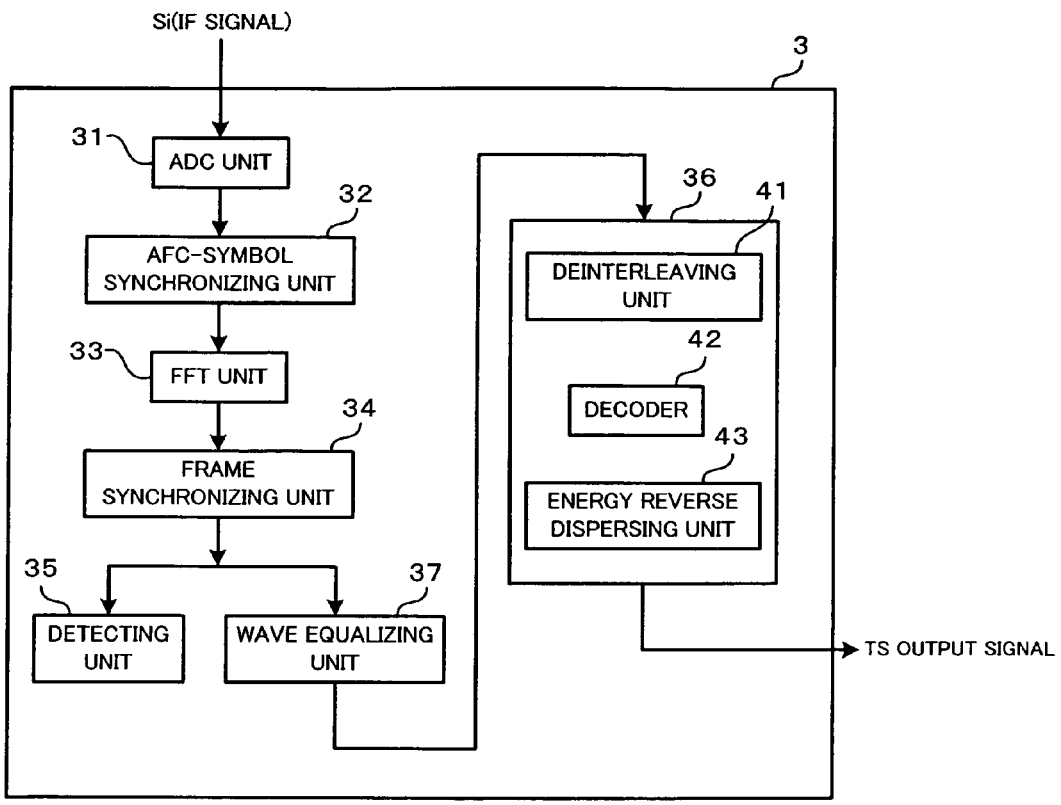
FIG. 7A is a block diagram showing a construction of a demodulator shown in FIG. 1B.

The demodulator 3 will be described below. FIG. 7A is a block diagram showing a construction of the demodulator 3. As shown in FIG. 7A, the demodulator 3 includes therein a number of units such as an ADC unit 31, as will be described below. The respective units as will be described below may be circuits each of which is specialized so as to carry out its function; or may be realized by general-purpose CPU, RAM, and so on, and a computer program that causes the CPU to operate so as to carry out each function as will be described below. In the latter case, the FFT unit 33 and so on as will be described later are realized by combining the hardware such as the CPU and so on with the computer program.

The demodulator 3 includes therein an ADC unit 31, an AFC-symbol synchronizing unit 32, a fast Fourier transform (FFT) unit 33, a frame synchronizing unit 34, a detecting unit 35, a wave equalizing unit 37, and an error correcting unit 36. The demodulator 3 performs demodulation processing and error correction processing to an IF signal.

An IF signal output from the tuner 2 is input to the ADC unit 31. The ADC unit 31 converts the input analogue signal Si into a digital signal, and outputs the converted digital signal to the AFC-symbol synchronizing unit 32. The AFC-symbol synchronizing unit 32 performs correction processing such as filter processing to the digital signal sent from the ADC unit 31. The AFC-symbol synchronizing unit 32 determines the start point of Fourier transform by the FFT unit 33 as will be described later, that is, a symbol synchronization point, to perform symbol synchronization. The AFC-symbol synchronizing unit 32 then outputs the digital signal to the FFT unit 33. Simultaneously with that, the AFC-symbol synchronizing unit 32 sends information on the symbol synchronization point to the controller 4. Further, the AFC-symbol synchronizing unit 32 derives information on a mode indicating an effective symbol length, and sends the information to a tuner controlling unit. In this embodiment, modes indicating effective symbol lengths include a mode 1 of an effective symbol length of 252 microseconds, a mode 2 of an effective symbol length of 504 microseconds, and a mode 3 of an effective symbol length of 1008 microseconds.

When a symbol synchronization point is determined, a point that makes it possible to realize the most suitable reception having the least influence of a delayed wave reaching with a delay, and so on, is set to the synchronization point. As a method of determining the synchronization point, a method in which correlation of signals is referred to; a method in which phase shift is corrected by using a pilot signal; or the like, is used.

The FFT unit 33 converts by Fourier transform, that is, by time-frequency transform, the digital signal sent from the AFC-symbol synchronizing unit 32. For the Fourier transform, so-called fast Fourier transform (FFT) is used in general. Because the digital signal is an OFDM signal, it has its waveform that has been converted by inverse Fourier transform, that is, its waveform in which a number of carrier waves modulated in accordance with data values are superimposed. The FFT unit 33 takes out the carrier waves modulated in accordance with data values, from the thus superimposed wave. The FFT unit 33 then rearranges digital signals corresponding to data values distributed to the respective carrier waves, so that the signals are temporally arranged in the original order of data. The FFT unit 33 thereby reproduces a digital signal corresponding to data before generation of the OFDM signal. The FFT unit 33 then outputs the digital signal to the frame synchronizing unit 34.

The frame synchronizing unit 34 synchronizes the digital signal sent from the FFT unit 33, in a unit of frame. One frame is constituted by, for example, 204 symbols, and a batch of TMCC information is obtained from one frame signal. The digital signal synchronized by the frame synchronizing unit 34 is output to the wave equalizing unit 37 and also to the detecting unit 35.

On the basis of a scattered pilot signal or the like contained in the digital signal, the wave equalizing unit 37 performs wave equalization processing to the digital signal that has been synchronized by the frame synchronizing unit 34. After correcting the signal by the wave equalization, the wave equalizing unit 37 demodulates, i.e., demaps, the signal into a digital signal corresponding to data values, and then outputs the demodulated, i.e., demapped, digital signal to the error correcting unit 36. On the other hand, the wave equalizing unit 37 measures a carrier-noise (CN) ratio by a normal noise measuring section or a test noise measuring section. More specifically, the wave equalizing unit 37 derives the difference between the constellation of each equalized carrier wave and a specified value on the basis of the scattered pilot signal or the like contained in the digital signal, when the wave equalizing unit 37 performs wave equalization processing to the digital signal. The wave equalizing unit 37 then calculates, as information on the CN ratio, a modulation error ratio (MER) of the received signal, from the difference between the constellation and the specified value. The wave equalizing unit 37 then sends the calculated MER to the controller 4.

The detecting unit 35 takes out TMCC information contained in the digital signal. The detecting unit 35 then sends the taken-out information on TMCC to the controller 4. The TMCC information includes information on a transmission system such as a carrier modulation method, such as 64 QAM, 16 QAM, or QPSK; and a convolution coding rate of, for example, ½, ⅔, ¾, ⅝, or ⅞. As the guard interval lengths adopted are ¼, ⅛, ¹⁄₁₆, and ¹⁄₃₂ of the length of an effective symbol.

The error correcting unit 36 performs error correction processing to the digital signal sent from the wave equalizing unit 37. The error correction processing includes deinterleave processing and decode processing. As shown in FIG. 7A, the error correcting unit 36 includes therein a deinterleaving unit 41, a decoder 42, and an energy reverse dispersing unit 43.

Figure 7B:
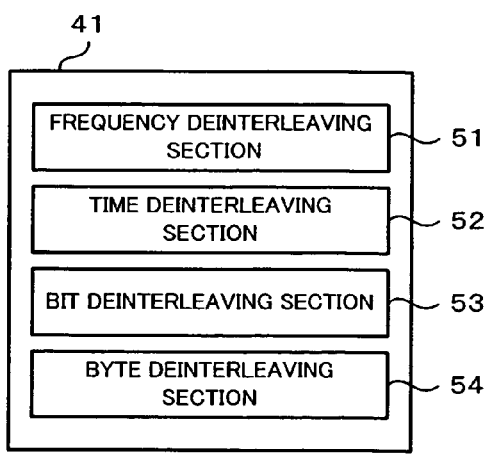
FIG. 7B is a block diagram showing a construction of a deinterleaving unit shown in FIG. 4A.

The deinterleaving unit 41 performs deinterleave processing to the digital signal sent from the wave equalizing unit 37. As shown in FIG. 7B, the deinterleaving unit 41 includes therein a frequency deinterleaving section 51, a time deinterleaving section 52, a bit deinterleaving section 53, and a byte deinterleaving section 54. The respective deinterleaving sections 51 to 54 perform frequency deinterleave processing, time deinterleave processing, bit deinterleave processing, and byte deinterleave processing, which correspond to the respective kinds of interleave processing as described above. The digital signal to which various kinds of interleave processing have been performed is restored by the above kinds of deinterleave processing to the digital signal before interleaving.

Figure 7C:
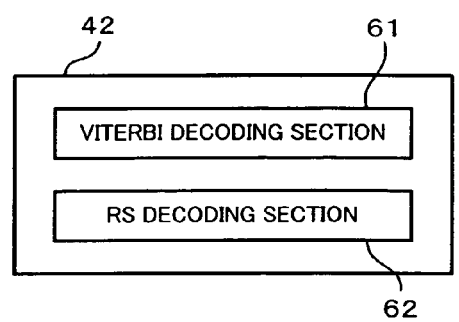
FIG. 7C is a block diagram showing a construction of a decoder shown in FIG. 4A.

The decoder 42 performs decode processing to the digital signal sent from the wave equalizing unit 37. As shown in FIG. 7C, the decoder 42 includes therein a Viterbi decoding section 61 and an RS decoding section 62. The respective decoding sections 61 and 62 perform Viterbi decode processing and RS decode processing, as described above. By the decode processing, signal errors contained in the digital signal are corrected, and the digital signal to which Viterbi coding and RS coding have been performed is restored to the original digital signal before coding.

The energy reverse dispersing unit 43 restores the digital signal sent from the wave equalizing unit 37, to the original digital signal before energy dispersal.

The above kinds of deinterleaving, decoding, and energy reverse dispersing are performed in an order corresponding to the order in which the kinds of interleaving, coding, and energy dispersing were performed on the transmission side. In the case of ISDB-T demodulation, processing is performed in the order of frequency deinterleaving, time deinterleaving, bit deinterleaving, Viterbi decoding, byte deinterleaving, energy reverse dispersal, and RS decoding.

The digital signal to which the above-described demodulation processing has been performed by the decoder 3 is output from the decoder 3 as a TS signal.

Noise contained in the signal output from the tuner 2 is a principal cause of generation of errors in the signal Si. The error correcting unit 36 performs error correction processing to the signal Si to correct the errors. However, when the signal errors contained in the digital signal output from the wave equalizing unit 37 exceeds a certain quantity, the error correcting unit 36 can not sufficiently correct the errors. When the error correcting unit 36 thus can not sufficiently correct the errors, accurate information on characters, sound, or the like, can not be taken out from the TS signal output from the demodulator 3 by demodulating the signal Si. That is, when the signal Si output from the tuner 2 contains noise high in intensity, it increases errors to be contained in the signal Si, which causes inaccurate demodulation by the demodulator 3.

Figure 8A:
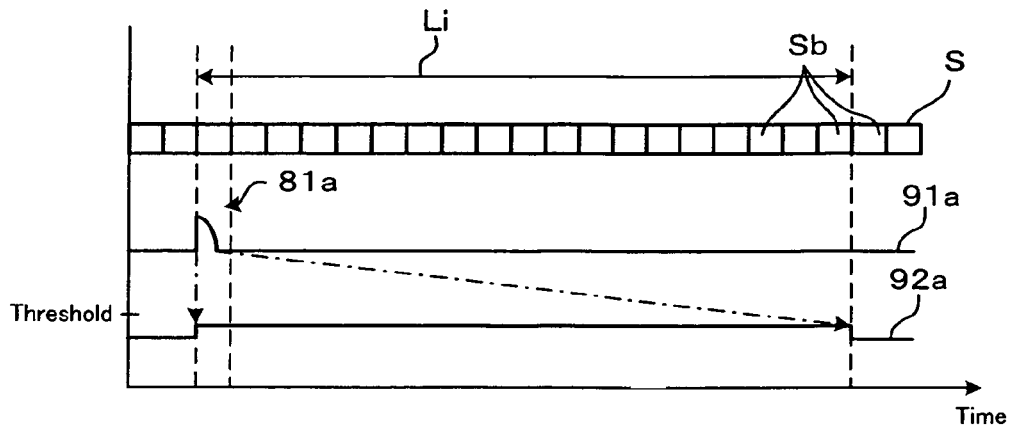
FIG. 8A is a timing chart when an error dispersed by a time deinterleaving section shown in FIG. 7B is less than a threshold for judging correctability of error.
Figure 8B:
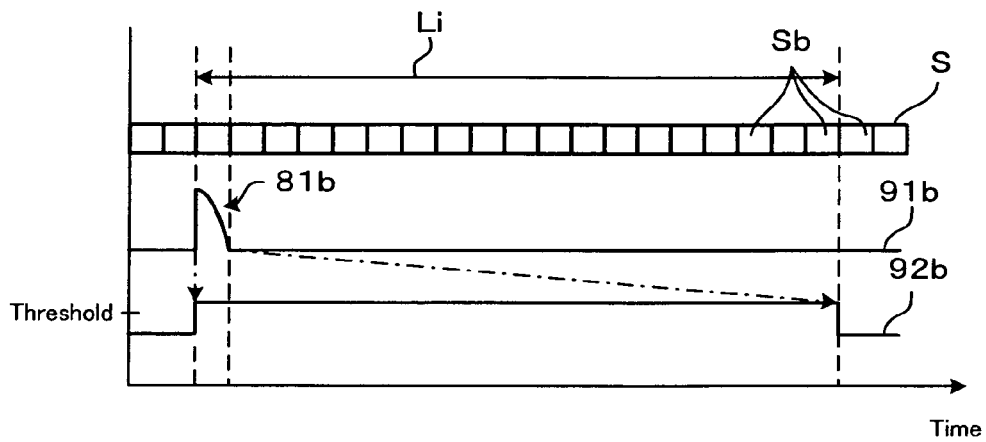
FIG. 8B is a timing chart when an error dispersed by the time deinterleaving section shown in FIG. 7B exceeds the threshold for judging correctability of error.

On the other hand, error correction processing includes deinterleave processing. Errors contained in the digital signal are dispersed by the deinterleave processing. For example, in the case of time deinterleaving, errors contained in one symbol are dispersed in the range of a time interleave length. FIGS. 8A and 8B show dispersion of errors contained in one symbol, by time deinterleaving. In FIG. 8A, curved lines 91a and 92a represent the intensities of errors contained in the signal S before and after time deinterleaving, respectively. The curved line 91a shows an error peak 81a appearing in a symbol Sb of the signal S before time deinterleaving. The curved line 92a shows errors dispersed in the range of a time interleave length Li by time deinterleaving.

The errors thus dispersed by the time deinterleaving are corrected by decoding the signal S. As shown by the curved line 92a, when the intensity of the dispersed errors is less than a threshold, which is a limit of the intensity of errors capable of being corrected, the errors contained in the signal S can sufficiently be corrected.

FIG. 8B shows a case wherein the errors contained in the signal S can not sufficiently be corrected. In FIG. 8B, curved lines 91b and 92b represent the intensities of errors contained in the signal S before and after time deinterleaving, respectively. As shown in the curved line 92b, the intensity of errors after an error peak 81b is dispersed by time deinterleaving exceeds the threshold. In this case, the errors contained in the signal S can not sufficiently be corrected.

Figure 8C:
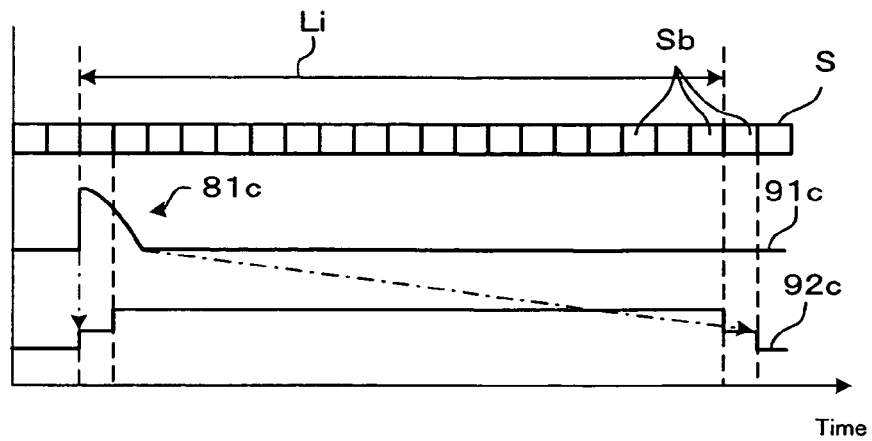
FIG. 8C is a timing chart showing dispersion of an error generated over two symbols, by the time deinterleaving section shown in FIG. 7B.

FIG. 8C shows a case wherein an error peak appears over two symbols. A curved line 91c shows an error peak 81c appearing over two symbols, contained in the signal S before time deinterleaving. A curved line 92c represents the intensity of errors after time deinterleaving. The region in which the first half of the error peak 81c is dispersed is shifted by one symbol from the region in which the second half of the error peak 81c is dispersed. The curved line 92c shows overlapping of the regions in which the parts of errors contained in the respective symbols have been dispersed. Thus, the errors contained in the time-deinterleaved signal S include overlapping of errors contained in a number of symbols.

<Control of Normal Power>

As described above, the power to be supplied to each circuit element of the tuner 2 has been set to an intensity having a sufficient margin so that the demodulator 3 can successfully perform demodulation processing. For example, in the case of FIG. 6A, when the curved line that represents the intensity of interference noise to the power to be supplied varies among the curved lines C1 to C3 in accordance with a change in interfering wave, the normal power storage section 102 stores therein an intensity of power not less than P2. However, in accordance with reception conditions of the cellular phone 1000, so intense interfering wave may not exist. For example, when the amplitude of interfering wave is no more than that shown by the curved line C2, the intensity of the power to be supplied to each circuit element may be nearly P1 smaller than P2. If the power to be supplied to each circuit element is kept at P2 or more even in that case, it brings about unnecessary consumption of power.

The controller 4 performs the following control so that the power of a proper intensity is supplied to each circuit element in accordance with not only the amplitude of interfering wave but also manufacturing variation of each circuit element; variation of the power to be supplied; variation of circuit characteristics in accordance with the operation environment; and so on.

Because it is impossible to estimate the amplitude of interfering wave to be mixed in through the antenna, the intensity of interference noise is unknown in general. Therefore, the controller 4 measures noise to evaluate the intensity of interference noise, and updates on the basis of the measurement result the power stored in the normal power storage section 102. An outline of the noise measurement and power update to be performed by the controller 4 is as follows.

First, the controller 4 calculates a temporal mean value of the intensities of noises measured over a time period A, as a second period, in which the normal power stored in the normal power storage section 102 is being supplied to a circuit element. The value of MER sent from the demodulator 3 is used for deriving the mean value. Next, the controller 4 supplies to the circuit element a test power less than the normal power stored in the normal power storage section 102, over a time period B, as a first period. The controller 4 then calculates a mean value of the intensities of noises measured over the time period B.

Figure 9:
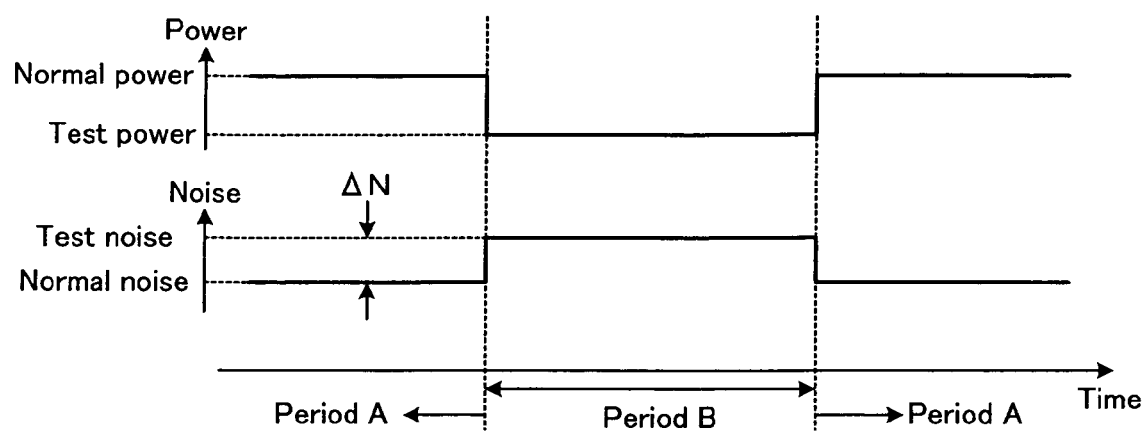
FIG. 9 is a timing chart showing a relation between electric power to be supplied to a circuit element in the tuner shown in FIG. 1B, and noise to be contained in a signal output from the tuner.

By way of example, FIG. 9 shows mean values of noises measured over the time period A in which the normal power is being supplied, and the time period B in which the test power is being supplied, respectively. When the signal output from the tuner 2 contains an interfering wave, the intensity of the noise measured over the time period B, that is, the test noise, is more than the intensity of the noise measured over the time period A, that is, the normal noise, by the intensity delta N of interference noise. The intensity of the interference noise can be thus derived. On the other hand, the relation between IIP3 and the intensity of the power to be supplied depends on the characteristics of each circuit element, and thus it is known. Therefore, the intensity of IIP3 to the power supplied in the time period B is also known.

Because the intensity of the interference noise is thus derived and the intensity of IIP3 is thus known, the amplitude of interfering wave is derived by the Expressions 13 and 14. As a result, the relation between the intensity of the interference noise and the intensity of the power to be supplied is derived. Using the relation between the intensity of the interference noise and the intensity of the power to be supplied, the controller 4 updates the intensity of the normal power stored in the normal power storage section 102.

Figure 10:
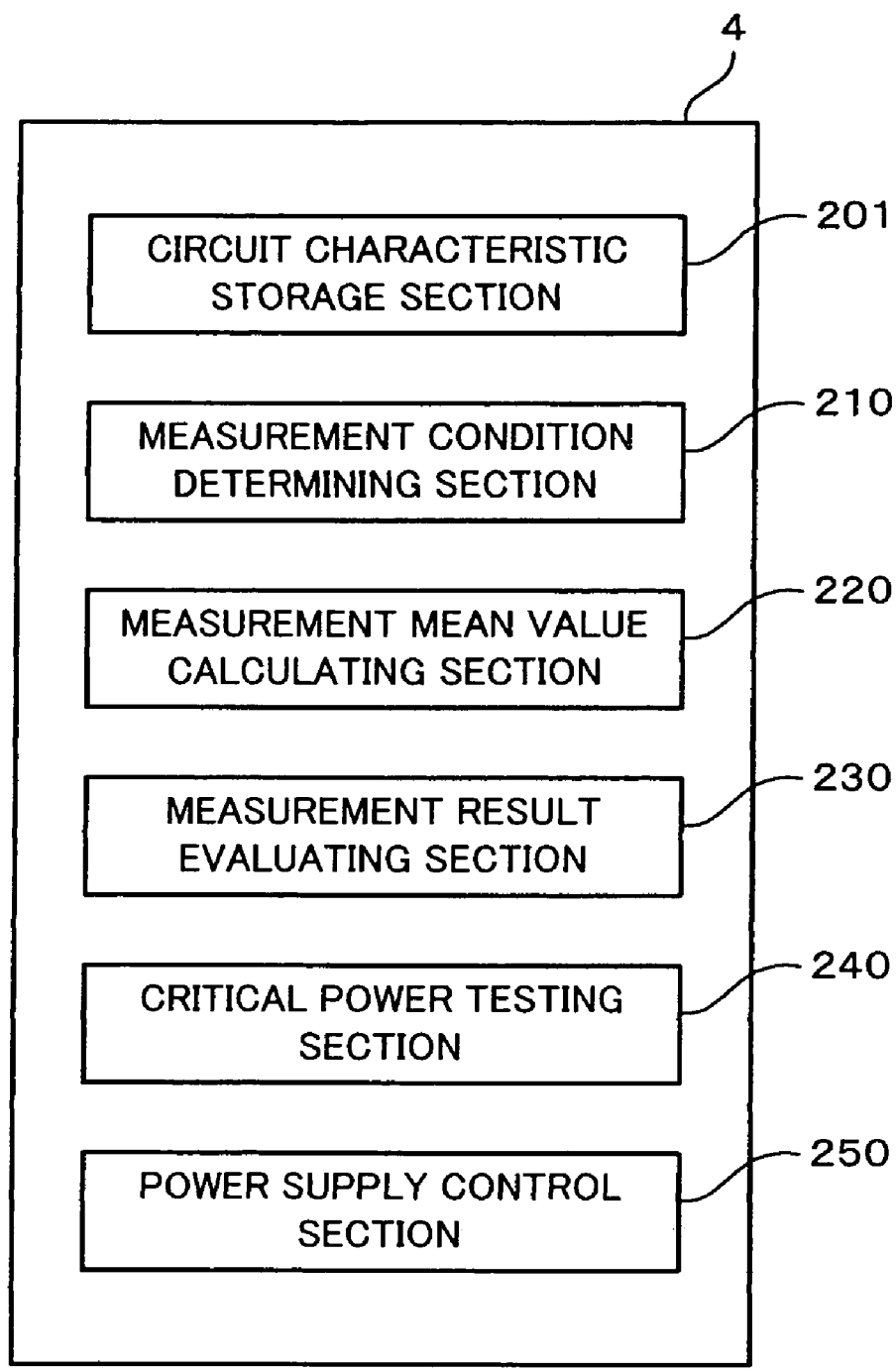
FIG. 10 is a block diagram showing a construction of a controller shown in FIG. 1B.

A specific construction of the controller 4 will be described below. FIG. 10 is a block diagram showing a construction of the controller 4. The controller 4 includes therein a circuit characteristic storage section 201, a measurement condition determining section 210, a measurement mean value calculating section 220, a measurement result evaluating section 230, a critical power testing section 240, and a power supply control section 250.

The circuit characteristic storage section 201 stores therein $alpha_1$, see the Expression 5, which is a coefficient to indicate the gain of a circuit element, and $alpha_3$, which is the third-order coefficient of the non-linear component, for each of the circuit elements such as the RF amplifier unit 21, with relating them to the intensity of the power to be supplied to the circuit element. Strictly speaking, the coefficients also depends on the operation conditions and operation environment of the circuit element. Therefore, the circuit characteristic storage section 201 preferably also stores therein information indicating relations of the coefficients to the operation conditions and operation environment. Thereby, control of the power to be supplied can be realized so as to be more suitable for the actual situation.

The measurement condition determining section 210 determines measurement conditions for the measurement of interference noise. First, the measurement condition determining section 210 determines a circuit element to be measured. In this embodiment, to measure interference noise, one test power is supplied to each of the RF amplifier unit 21, the mixer unit 22, the VCO-PLL unit 23, the filter unit 24, and the IF amplifier unit 25. The measurement condition determining section 210 then determines the intensity of the test power to be supplied to each circuit element, and the time period B. The intensity of the test power and the time period B are determined so that the demodulator 3 can successfully perform error correction processing. If a test power less than the normal power is supplied to a circuit element when an interfering wave exists, noises contained in the output signal from the circuit element increases. This increases errors to be contained in the signal Si output from the tuner 2. At this time, symbols of the signal Si in which errors are contained, and the intensity of the errors, vary in accordance with the time period B in which the test power is being supplied. In addition, the intensity of the errors also depends on the intensity of the test power.

Therefore, the measurement condition determining section 210 determines the time period B so as to be within the time period of one symbol. Thereby, error generation is restricted to one symbol. Thus, the influence of noises that increases by the supply of the test power is suppressed to the minimum range. In addition, the errors contained in one symbol are dispersed by time deinterleaving, as shown in FIG. 8A. Therefore, the measurement condition determining section 210 determines the intensity of the test power so that the intensity of errors after dispersed by time deinterleaving is not more than the threshold for making error correction by error correction processing possible. If errors can not be corrected as a whole when a certain symbol contains errors, the time period B may be determined such that the test power starts to be supplied at a time later than the symbol by a certain time period. For example, the time period B may be determined such that a time after a time interleave length or more from the symbol is set to the start time.

Alternatively, the time period B may be determined so as to be over a number of symbols. In this case, however, as shown in FIG. 8C, the regions in which the errors contained in two symbols have been dispersed overlap each other. Therefore, the start time of the time period B and the intensity of the test power are determined so that the intensity of the errors contained in the time-deinterleaved signal in the overlapping portion of the regions is not more than the threshold for making error correction possible.

As described above, the intensity of the test power and the time period B in which the test power is to be supplied are determined so that the demodulator 3 can successfully perform error correction processing. Therefore, the measurement of interference noise never interferes demodulation processing by the demodulator 3.

On the basis of the value of MER sent from the demodulator 3, the measurement mean value calculating section 220 derives the CN ratio of the noise contained in the signal Si output from the tuner 2 to the demodulator 3; and calculates the temporal mean value and variance. More specifically, the measurement mean value calculating section 220 calculates two kinds of means values and variances. One kind is the temporal mean value and variance of the CN ratio on the basis of MER, corresponding to normal noise, measured in the time period A in which the normal power is being supplied to the circuit element. The time period A may be determined in advance or may be the total time period from a certain time to the present time. The other kind is the mean value and variance of the CN ratio on the basis of MER, corresponding to test noise, measured in the time period B in which the test power is being supplied to the circuit element. Either of the mean value and variance in the time period A and the mean value and variance in the time period B may be the mean value and variance in some part of the time period A or B. However, they are preferably the mean value and variance of values measured over a time period as long as possible.

Figure 11A:
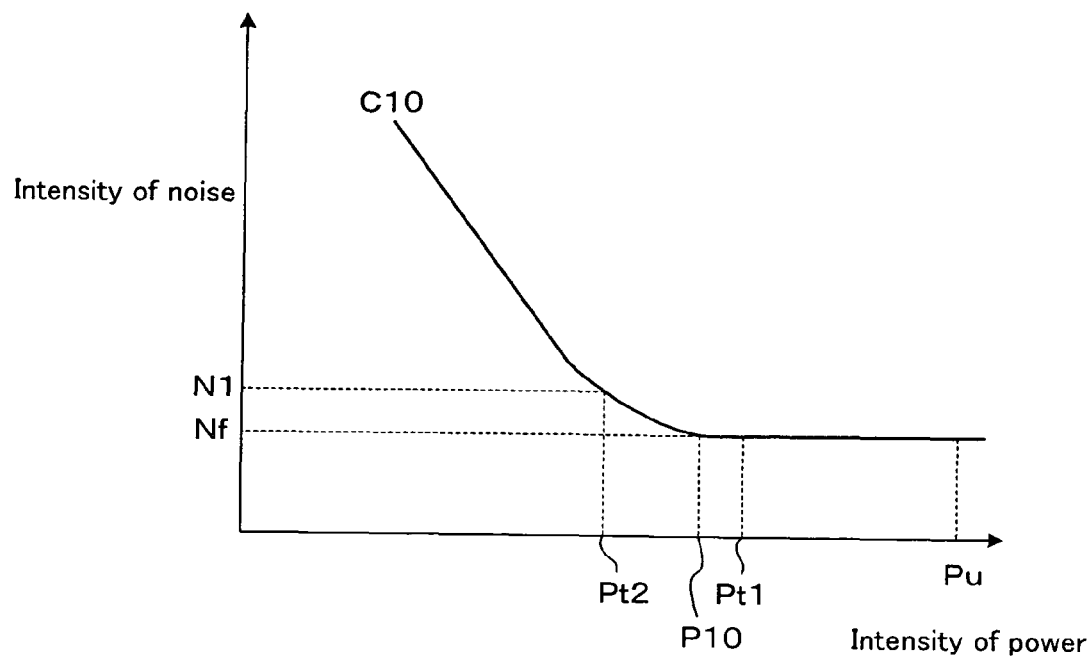
FIG. 11A is a graph showing relations of the intensities of test power and critical power determined by the controller of FIG. 10 and the intensity of existing normal power, to noise contained in an output signal from a circuit element, when noises other than interfering wave noise scarcely change relatively to the power supplied to the circuit element.
Figure 11B:
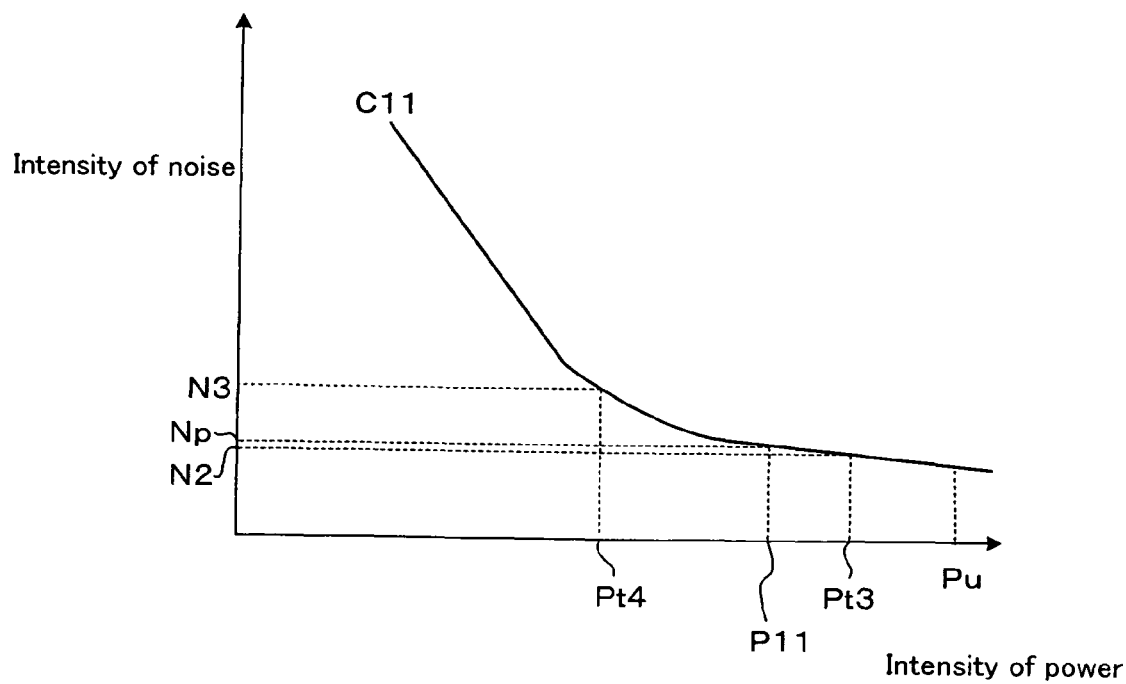
FIG. 11B is a graph showing relations of the intensities of test power and critical power determined by the controller of FIG. 10 and the intensity of existing normal power, to noise contained in the output signal from the circuit element, when noises other than interfering wave noise change relatively to the power supplied to the circuit element.

The measurement result evaluating section 230 evaluates the measurement result on the basis of the mean value of the CN ratio calculated by the measurement mean value calculating section 220, and information on circuit characteristics stored in the circuit characteristic storage section 201. The measurement result evaluating section 230 then determines an update value for the normal power. By way of example, curved lines C10 and C11 of FIGS. 11A and 11B show changes in the intensity of the noise contained in the output signal from a circuit element measured. In FIGS. 11A and 11B, the axis of abscissas represents the intensity of the power to be supplied to the circuit element; and the axis of ordinate represents the intensity of noise.

Of two kinds of mean values calculated by the measurement mean value calculating section 220, the mean value in the time period A is the mean value of the CN ratio measured when the current normal power is supplied to the circuit element. Because the CN ratio is calculated on the basis of MER measured by the demodulator 3, the CN ratio indicates the intensity of the noise contained in the signal Si output from the tuner 2. That is, the CN ratio also includes noises generated in other circuit elements downstream in the signal flow of the circuit element for which the normal power is to be updated.

For example, a change in the power supplied to a circuit element brings about not only a change in the intensity of interference noise generated in the circuit element but also a change in the amplitude of the interfering wave itself contained in the signal output from the circuit element. Therefore, in the difference between the test noise and the normal noise measured in the demodulator 3 when a test power is supplied to a circuit element, there appear two of the influence of amplification of a change in the interference noise generated in the circuit element, by circuit elements downstream of that circuit element; and the influence of a change in the interference noise generated in the circuit elements downstream of that circuit element. Thus, to specify the intensity of the interference noise generated in a circuit element, the gain and IIP3 of any circuit element downstream of that circuit element must have been known. The below description is on the assumption that the gain and IIP3 of each circuit element is derived on the basis of information stored in the circuit characteristic storage section 201, and the intensity of the noise contained in the output signal from each circuit element is specified in the consideration of the influence of the downstream circuit elements.

Further, in the below description, for the purpose of simplification, the power to be supplied is controlled by comparison of the intensity of the noise contained in the output signal from a circuit element in the time period A or B, with a noise permissible value or the like. More specifically, however, the power to be supplied may be controlled by comparison of the mean value and variance calculated by the measurement mean value calculating section 220, with various kinds of noise reference values. That is, in the below description, comparison of the intensity of the noise contained in the output signal from a circuit element in the time period A or B, with various kinds of noise reference values, is equivalent to comparison of the normal or test noise with the noise permissible value or the like.

When the intensity of the current normal power is Pu shown in FIG. 11A, the intensity Nf of the noise other than the interference noise is derived from the mean value in the time period A. As described before, Nf includes (2) device noise generated in the analogue circuit, (3) noises generated in another analogue circuit, and (4) noises generated before input to the tuner. The intensity Nf other than the interference noise is substantially constant as described before, and Nf corresponds to the noise permissible value. That is, in order that the intensity of the noise to be contained in the output signal from the circuit element does not exceed Nf, the intensity of the normal power is controlled as follows.

Of two kinds of mean values calculated by the measurement mean value calculating section 220, the mean value in the time period B is the mean value of the CN ratio measured when a test power is supplied to the circuit element. When the intensity of the test power supplied to the circuit element is Pt1 shown in FIG. 11A, the intensity of the noise is Nf, which is equal to the value measured in the time period A. That is, the mean value in the time period B calculated by the measurement mean value calculating section 220 substantially coincides with the mean value in the time period A. Because the intensity of the noise contained in the output signal from the circuit element when the test power Pt1 is supplied, is Nf, no influence of interference noise appears in the noise to be contained in the output signal from the circuit element even when the normal power is reduced to the test power Pt1. Thus, the measurement result evaluating section 230 determines the update value for the normal power to Pt1.

On the other hand, when the intensity of the test power supplied to the circuit element in the time period B is Pt2, the intensity of the test noise in the time period B is N1, which is larger than Nf by the intensity of interference noise. From the fact that the noise larger than Nf was thus measured, it is first detected that interference noise has been generated. The intensity of the interference noise is then derived from the difference between Nf and N1. On the other hand, the Expressions 13 and 14 give the relation of the IIP3 and the amplitude of interfering wave to the intensity of interference noise. In addition, from $alpha_1$ and $alpha_3$ stored in the circuit characteristic storage section 201 with relating to the intensity of the power to be supplied, and the Expression 12, a relation between IIP3 and the intensity of the power to be supplied is derived. From the difference between Nf and N1, the relation between IIP3 and the intensity of the power to be supplied, and the Expressions 12 to 14, the measurement result evaluating section 230 evaluates the amplitude of the interfering wave contained in the signal Sr to be input to the tuner 2. From the result of the evaluation, the measurement result evaluating section 230 specifies, on the basis of the Expressions 13 and 14, the curved line C10 indicating the relation between the intensity of the power to be supplied and the intensity of noise. The measurement result evaluating section 230 then specifies a critical power P10 as a boundary at which the influence of the interference noise starts to appear on the curved line C10.

In consideration of manufacturing variation, operation conditions, and so on, of the circuit element, the measurement result evaluating section 230 sets the update value for the normal power to a value more than the critical power P10. For example, when variation of the operation conditions of the circuit element and a change in the interfering wave are estimated to be sufficiently little, the update value may be determined to a value near the critical power P10. Contrastingly, when they are estimated to change widely, the update value may be determined to a value considerably higher than the critical power P10. The variations of the operation conditions and so on of the circuit element may be estimated on the basis of set values that have been set in advance, or may be estimated by using a variance of the CN ratio on the basis of actual measured values, such as MER, measured in the demodulator 3. In most cases, the intensity Nf of the noise at the critical power P10 is sufficiently lower than the noise permissible value Np, which represents the intensity of noise that allows the demodulator 3 to accurately demodulate the signal Si. Therefore, the update value may be set to a power less than the critical power P10 and more than a power that causes generation of noise having its intensity of the noise permissible value Np.

As shown in FIG. 11B, when a change in the noise other than the interference noise can not be ignored to a change in the power to be supplied, it is difficult to specify the critical power, in comparison with the case of FIG. 11A. That is, as shown in FIG. 11A, when the noise other than the interference noise is substantially constant, the power as the boundary at which the interference noise starts to appear is definite. However, as shown in FIG. 11B, when the noise other than the interference noise varies in accordance with the power to be supplied, the power as the boundary at which the interference noise starts to appear is indefinite.

Therefore, when a change in the noise other than the interference noise can not be ignored to a change in the power to be supplied, the measurement result evaluating section 230 determines an update value by considering the critical power to be the power of an intensity P11 corresponding to the case wherein the intensity of the noise is equal to the noise permissible value Np. First, when the intensity of the test power to be supplied to the circuit element is Pt3, the intensity of the noise to be contained in the output signal from the circuit element in the time period B is N2. When N2 is not more than the noise permissible value Np, the measurement result evaluating section 230 determines the update value to Pt3.

Next, when the intensity of the test power to be supplied to the circuit element is Pt4, the intensity of the noise to be contained in the output signal from the circuit element in the time period B is N3. When the mean value thus exceeds Np, the measurement result evaluating section 230 derives the critical power P11 as follows. The circuit characteristic storage section 201 preferably stores therein information indicating a relation between the noise other than interference noise and the intensity of the power to be supplied. The relation between the intensity of the power to be supplied to the circuit element and the intensity of the interference noise is given by the Expressions 12 to 14. Therefore, from the relation between the noise other than the interference noise and the intensity of the power to be supplied, the relation between the intensity of the power to be supplied to the circuit element and the intensity of the interference noise, the intensity Pt4 of the test power, and the mean value N3 of the intensity of the noise, a relation between the intensity of the power to be supplied and the intensity of the noise is derived. From the relation between the intensity of the power to be supplied and the intensity of the noise, the intensity P11 of the critical power corresponding to the noise permissible value Np is then derived. The measurement result evaluating section 230 determines the update value to a value not less than P11 and less than the current normal power Pu.

When the output signal from the circuit element contains noise having its intensity more than Nf in the time period B, the critical power testing section 240 controls the power supply unit 100 to actually supply to the circuit element the critical power specified by the measurement result evaluating section 230. The critical power testing section 240 then judges by the intensity of MER measured in the demodulator 3 whether or not the output signal from the circuit element contains noise having its intensity considerably higher than Nf, that is, the noise permissible value, when the critical power is supplied to the circuit element.

The power supply control section 250 controls the test power storage section 103 to store therein the intensity of the test power determined by the measurement condition determining section 210. In addition, the power supply control section 250 instructs the power supply unit 100 to supply the test power in place of the normal power over the time period B determined by the measurement condition determining section 210.

Further, on the basis of the mean value calculated by the measurement mean value calculating section 220, when the output signal from the circuit element contains noise having its intensity not more than Nf in the time period B, the power supply control section 250 controls the normal power storage section 102 to store therein the update value determined by the measurement result evaluating section 230. On the other hand, on the basis of the mean value calculated by the measurement mean value calculating section 220, when the output signal from the circuit element contains noise having its intensity more than Nf in the time period B, the power supply control section 250 controls the normal power storage section 102 to store therein the update value determined by the measurement result evaluating section 230 only when the critical power testing section 240 has decided that the intensity of the noise contained in the output signal from the circuit element does not considerably exceeds Nf when the critical power is supplied to the circuit element.

Thus, in the normal operation of the circuit element, a power less than the normal power before updating is supplied to the circuit element. Therefore, the power consumption of the circuit element is reduced in comparison with the power consumption before the updating. In addition, because the update value for the normal power is determined in consideration of the influence of interfering wave, the demodulator 3 can accurately perform demodulation processing. Further, the power supply control section 250 updates the normal power after an actual measurement as to whether or not the intensity of the noise contained in the output signal from the circuit element does not considerably exceeds Nf when the critical power is supplied to the circuit element. This makes the demodulator 3 more surely perform the accurate demodulation processing.

The measurement of the test power is carried out only one time in a certain partial period in the time period B. Thus, by only one time of the test power measurement, it is judged whether or not an interfering wave exists and what amplitude of the interfering wave is, and thereby the normal power can properly be updated. Alternatively, such a test power measurement may be carried out in each of a number of partial periods that do not overlap each other. In this case, the measurement mean value calculating section 220 calculates a temporal mean value of the CN ratio in each partial period, from MER measured in the partial periods. The measurement mean value calculating section 220 then calculates a mean value of the calculated mean values. The measurement result evaluating section 230 determines an update value for the normal power on the basis of the mean value of the results of the measurements in the partial periods calculated by the measurement mean value calculating section 220. In this case, in comparison with the case wherein the update value for the normal power is determined by only one time of measurement, a more proper update value can be determined by accurately grasping the actual reception conditions.

An example of error correction of data contained in a signal coded by convolution coding such as Viterbi coding will be described below. In the convolution coding, for each data item contained in the signal before coding, a coded data item is generated by a predetermined rule in accordance with the arrangement of one or more data items precedent to the target data item. On the other hand, in the input signal, when it is assumed that the noise power is constant and less than the input signal, it is supposed that a data item of a high input power is high in reliability while a data item of a low input power is low in reliability. In a data string in which a predetermined number of data items are thus successive, a weight, i.e., reliability, corresponding to the size or the like of each data item is calculated for each data item on the basis of the size or the like of the data item. When part of coded data is erroneously converted into a data string different from its proper data string, the probability of generation of the different data string varies in accordance with the degree in which the data string differs from its original data string. In Viterbi decoding, on the basis of the above-described weight of each data item itself and the probability with which the proper data arrangement is not obtained due to an error, the data string is corrected to a data string near the correct arrangement before generation of the error, that is, a data string having the most probable arrangement.

In the Viterbi decoding as described above, the controller 4 and the error correcting unit 36 perform control as follows. When the power supply control section 250 instructs the power supply unit 100 to supply a test power, the power supply unit 100 supplies the test power to a circuit element. At this time, because the test power is less than the current normal power, as described above, the noise contained in the output signal from the circuit element may temporarily increase. The increase in the noise contained in the output signal from the circuit element brings about an increase in errors contained in the signal Si output from the tuner 2. This reduces the reliability of information contained in the portion of the signal Si corresponding to the increase in the errors. In this case, because the reliability by the normal power differs from the reliability by the test power, the correct data arrangement can be no longer realized with the weight set by the input power of each data item of the signal Si as described above.

Therefore, the controller 4 sends to the error correcting unit 36 information on the time period B in which the test power is supplied. On the basis of the information sent from the controller 4, the error correcting unit 36 changes the weights of the data string containing the data corresponding to the time period B so as to lower the reliability of the positions corresponding to the time period B in the Viterbi decoding. The Viterbi decoding is then performed on the basis of the changed weights. Thus, more accurate error correction is performed on the basis of the reliability having lowered due to the supply of the test power.

<General Flow of Updating Normal Power According to First Embodiment>

Figure 12:
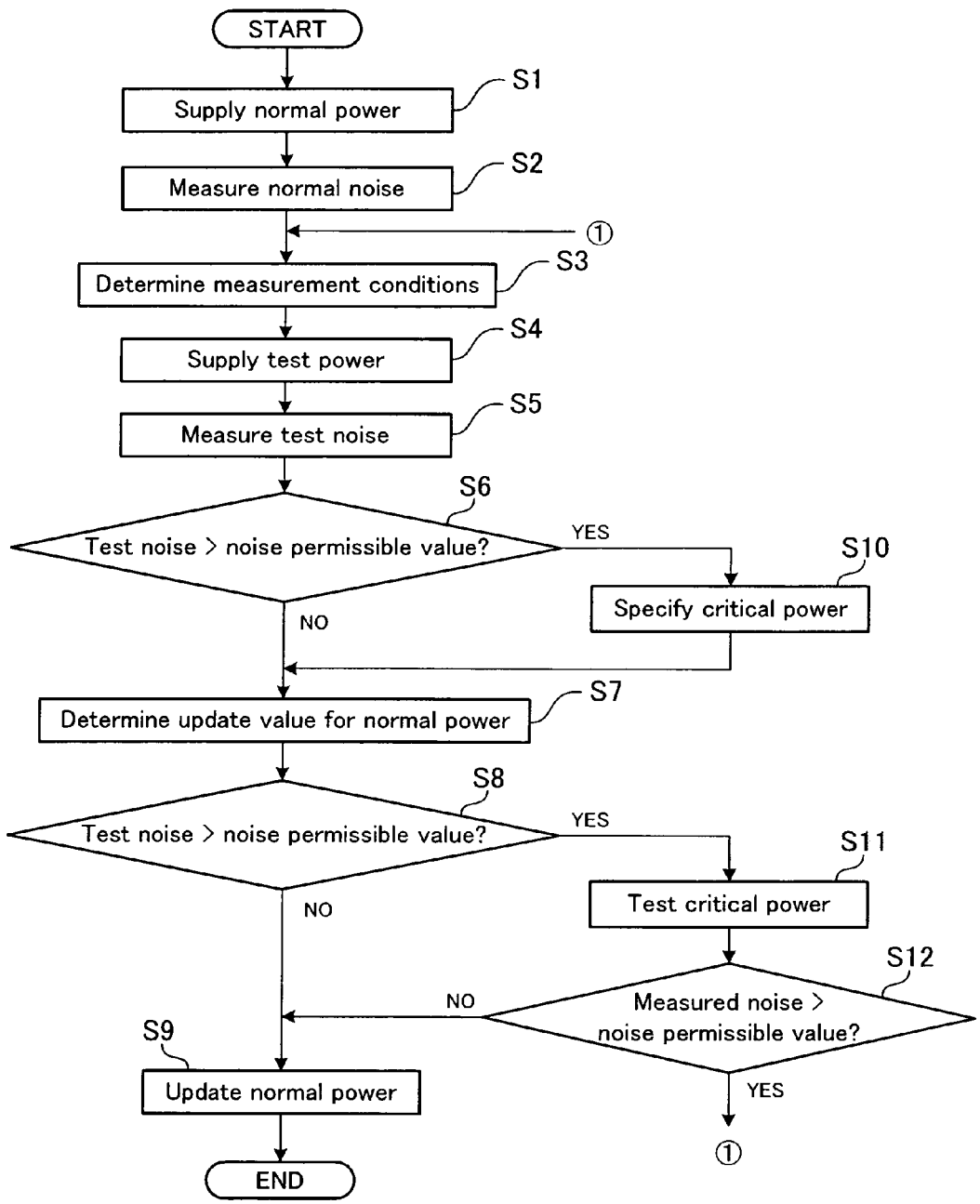
FIG. 12 is a flowchart showing a series of control steps to be performed in the digital demodulating apparatus of FIG. 1B till the intensity of normal power to be supplied to a circuit element in the tuner is updated.

The flow of control to update the normal power according to the first embodiment will be described below. FIG. 12 is a flowchart showing the flow of the control.

First, In Step S1, the power supply unit 100 supplies the current normal power to the RF amplifier unit 21 and so on over the time period A. In Step S2, the wave equalizing unit 37 measures the intensity of the noise contained in the signal Si output from the tuner 2 when the normal power is supplied. More specifically, the wave equalizing unit 37 calculates MER in the time period A and then sends the calculated MER to the controller 4. From the MER sent from the demodulator 3, the measurement mean value calculating section 220 calculates a temporal mean value of the CN ratio in the time period A.

In Step S3, the measurement condition determining section 210 determines a circuit element to be supplied with a test power, the intensity of the test power, and the time period B in which the test power is supplied. In Step S4, the power supply control section 250 controls the power supply unit 100 to supply the test power to the circuit element over the time period B. In Step S5, the wave equalizing unit 37 calculates MER in the time period B and then sends the calculated MER to the controller 4. The measurement mean value calculating section 220 then calculates a temporal mean value of the CN ratio in the time period B from the MER sent from the demodulator 3.

In Steps S6, S7, and S10, the measurement result evaluating section 230 determines an update value for the normal power from the mean value calculated by the measurement mean value calculating section 220. At this time, the measurement result evaluating section 230 judges in Step S6 by the mean value of the CN ratio in the time period B calculated in Step S5 whether or not the intensity of the noise contained in the output signal from the circuit element is higher than the noise permissible value in the time period B. When the noise intensity is higher than the noise permissible value, that is, Yes in Step S6, the measurement result evaluating section 230 specifies a critical power in Step S10 and then determines an update value in Step S7. When the intensity of the noise contained in the output signal from the circuit element is not higher than the noise permissible value in the time period B, that is, No in Step S6, the measurement result evaluating section 230 adopts the test power as the update value to be determined in Step S7.

Afterward, when the intensity of the noise contained in the output signal from the circuit element is higher than the noise permissible value in the time period B, that is, Yes in Step S8, the critical power testing section 240 instructs in Step S11 the power supply unit 100 to actually supply to the circuit element the critical power specified in Step S10. When the CN ratio derived from MER measured in the demodulator 3 at that time is higher than the noise permissible value, that is, Yes in Step S12, the flow returns to Step S3 to again specify a critical power and determine an update value. On the other hand, from the CN ratio derived from MER measured in the demodulator 3, when the intensity of the noise contained in the output signal from the circuit element is not higher than the noise permissible value in the time period B, that is, No in Step S12, the flow advances to Step S9.

When the judgment in Step S8 has resulted in that the intensity of the noise contained in the output signal from the circuit element is not higher than the noise permissible value in the time period B, that is, No in Step S8, the flow advances to Step S9. In Step S9, the power supply control section 250 updates the normal power to the update value determined in Step S7.

Second Embodiment

A second embodiment of the present invention different from the first embodiment will be described below. The second embodiment has many features common to those of the first embodiment, and thus only different features will be mainly described below.

Figure 3B:
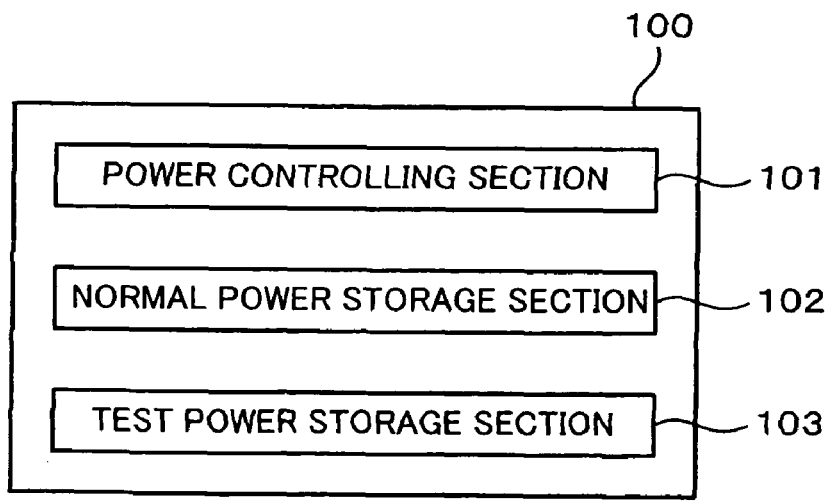
FIG. 3B is a block diagram showing a construction of a power supply unit shown in FIG. 3A.

FIG. 3 is a block diagram showing a construction of a controller 304 of the second embodiment corresponding to the controller 4 of the first embodiment. The controller 304 includes therein a circuit characteristic storage section 310, a measurement condition determining section 320, a measurement mean value calculating section 330, a power reducing section 340, a noise improving section 350, and a power supply control section 360.

The circuit characteristic storage section 310 stores therein information on characteristics of each circuit element such as the RF amplifier unit 21 included in the tuner 2. The information is used for, for example, determination of measurement conditions by the measurement condition determining section 320.

The measurement condition determining section 320 determines measurement conditions when measuring test noise of each circuit element. Like the first embodiment, the measurement conditions to be determined by the measurement condition determining section 320 includes a circuit element to be measured, the intensity of a test power, and a time period in which the test power is supplied. The measurement condition determining section 320 determines the measurement conditions so that the demodulator 3 can successfully perform error correction processing. Details of the determination of the measurement conditions are like those of the first embodiment. For example, the time period in which the test power is supplied is determined so as to fall within one symbol; and the intensity of the test power is determined so as to be within a range in which the demodulator 3 can successfully perform error correction processing.

The power supply control section 360 controls the test power storage section 103 to store therein the intensity of the test power determined by the measurement condition determining section 210. In addition, the power supply control section 360 instructs the power supply unit 100 to supply the test power in place of the normal power in accordance with the measurement conditions determined by the measurement condition determining section 210.

On the basis of the value of MER sent from the demodulator 3, the measurement mean value calculating section 330 derives the CN ratio of the noise contained in the signal Si output from the tuner 2 to the demodulator 3; and calculates the temporal mean value and variance. Thereby calculated are the mean value and variance corresponding to each of the intensity of the normal noise contained in the signal Si output from the tuner 2 when the normal power is supplied to the circuit element, and the intensity of the test noise when the test power is supplied to the circuit element. Details of the measurement are like those of the first embodiment.

On the basis of the mean value of the CN ratio corresponding to the test noise, calculated by the measurement mean value calculating section 330, the power reducing section 340 and the noise improving section 350 determine update values for the normal power, that is, the power reducing section 340 and the noise improving section 350 serve as a power reduction updating section and a noise improvement updating section, respectively. The power reducing section 340 determines an update value for the normal power to a value lower than the current normal power. The noise improving section 350 determines an update value for the normal power so that the update of the normal power brings about a reduction of the noise contained in the signal Si output from the tuner 2.

When updating the intensity of the normal power, a noise intensity stable range is referred to. The noise intensity stable range means a noise range in which errors to be contained in the signal Si output from the tuner 2 fall within a range in which the errors can be corrected, and the power to be supplied to the circuit element is not too high. If the intensity of the noise contained in the signal Si is too high, errors to be contained in the signal Si due to the noise exceeds the range in which the errors can be corrected. Such a range in which errors can be corrected depends on the power of error correction processing by the error correcting unit 36, and the range is known. On the other hand, when the intensity of the noise contained in the signal Si is low, errors to be contained in the signal Si are within the range in which the errors can be corrected. Therefore, when the errors are within the range in which the errors can be corrected, there is no need of more reducing the noise.

In this embodiment, therefore, the upper and lower limits of the intensity of the noise to define a noise stability region, that is, noise reference values, have been set in advance so that errors to be contained in the signal Si due to the noise fall within a range in which the errors can be corrected. The controller 304 controls the power to be supplied to each circuit element so that the intensity of the noise to be contained in the signal Si output from the tuner 2 falls within the stability region.

More specifically, on the basis of the mean value corresponding to the normal noise, calculated by the measurement mean value calculating section 330, when the normal noise is not less than the upper limit of the stability region, the controller 304 controls the noise improving section 350 to determine an update value for the normal power. On the other hand, when the normal noise is not more than the lower limit of the stability region, the controller 304 controls the power reducing section 340 to determine an update value for the normal power. By comparing the intensity of test noise with the upper and lower limits of the stability region, the power reducing section 340 and the noise improving section 350 judge whether or not the intensity of the test noise is within the stability region. At this time, each of the power reducing section 340 and the noise improving section 350 serves as a comparing section. When the intensity of the test noise is within the stability region, the power reducing section 340 and the noise improving section 350 adopt the intensity of the test power as the update value for the normal power. The power supply control section 360 then controls the normal power storage section 102 to store therein the update value determined by the power reducing section 340 or the noise improving section 350. Like the first embodiment, it is adoptable that a variance is calculated when the temporal mean value corresponding to noise is calculated; a highly reliable noise value having a margin to variation is obtained from the mean time and the variance; and such noise values are used in place of the normal noise and the test noise.

<General Flow of Updating Normal Power According to Second Embodiment>

Figure 14:
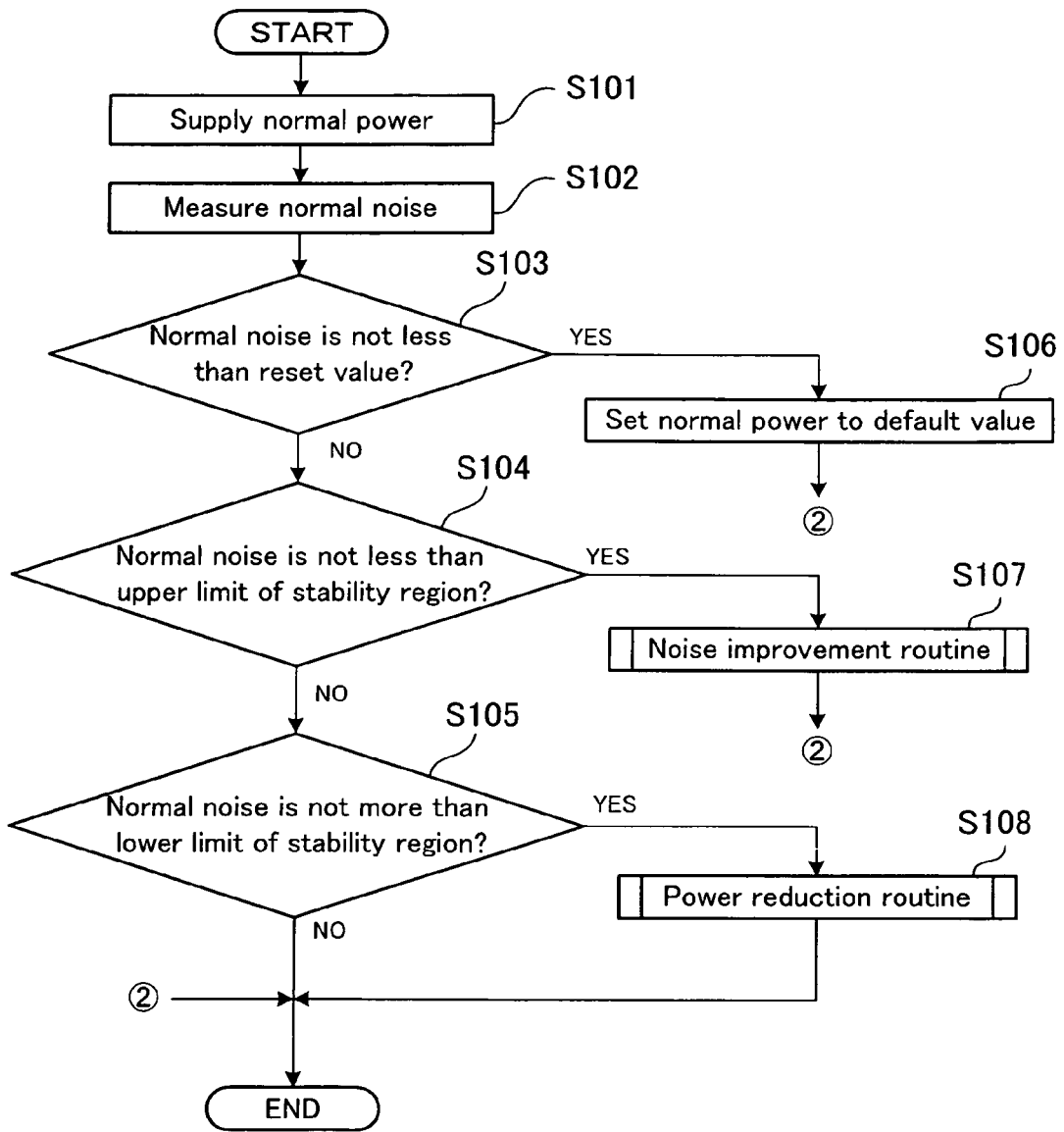
FIG. 14 is a flowchart showing a series of control steps to be performed by the controller of FIG. 13 till the intensity of normal power to be supplied to a circuit element in the tuner is updated.
Figure 15:
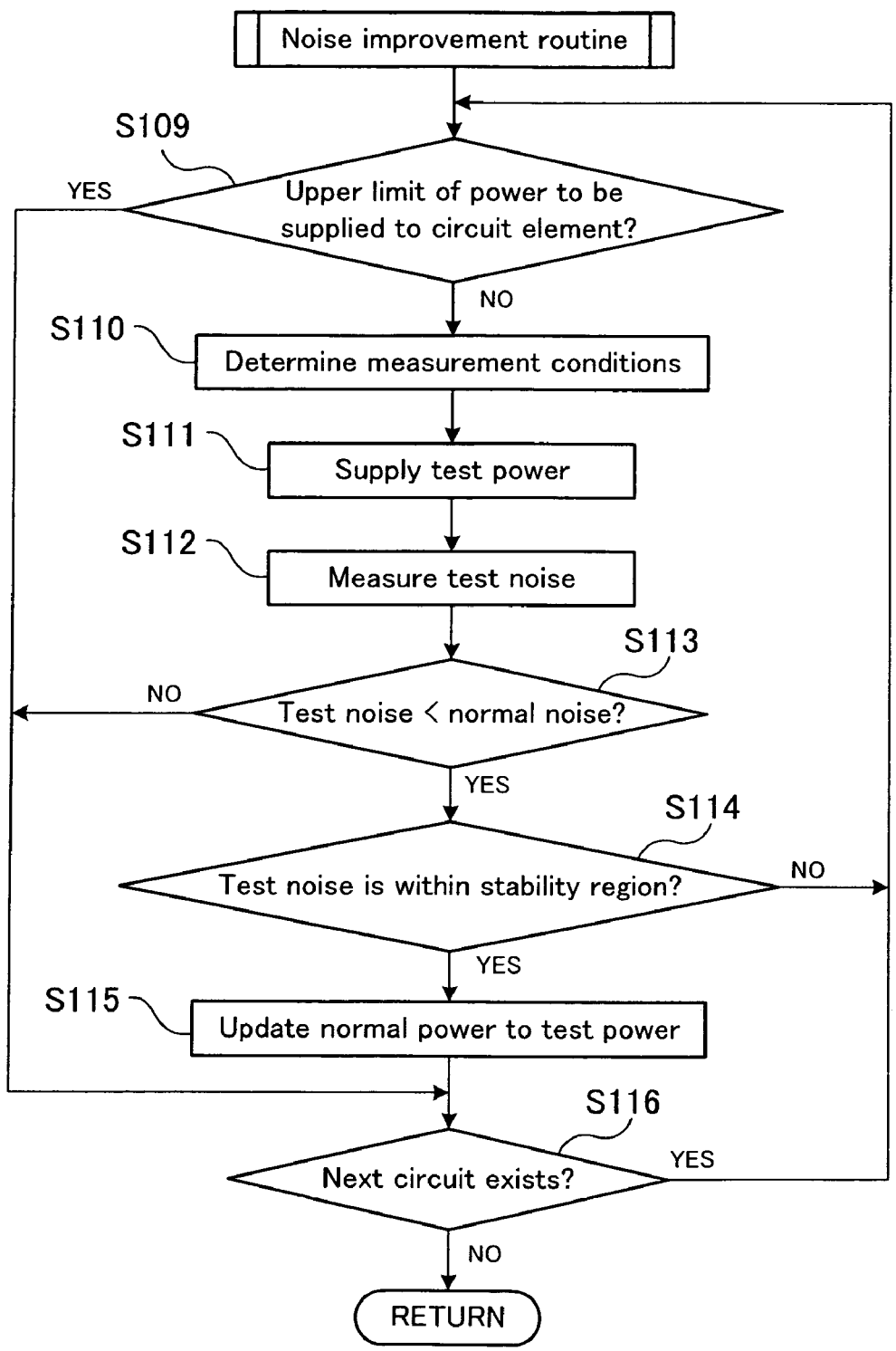
FIG. 15 is a flowchart showing a noise improvement routine to be called in the flow of FIG. 14.
Figure 16:
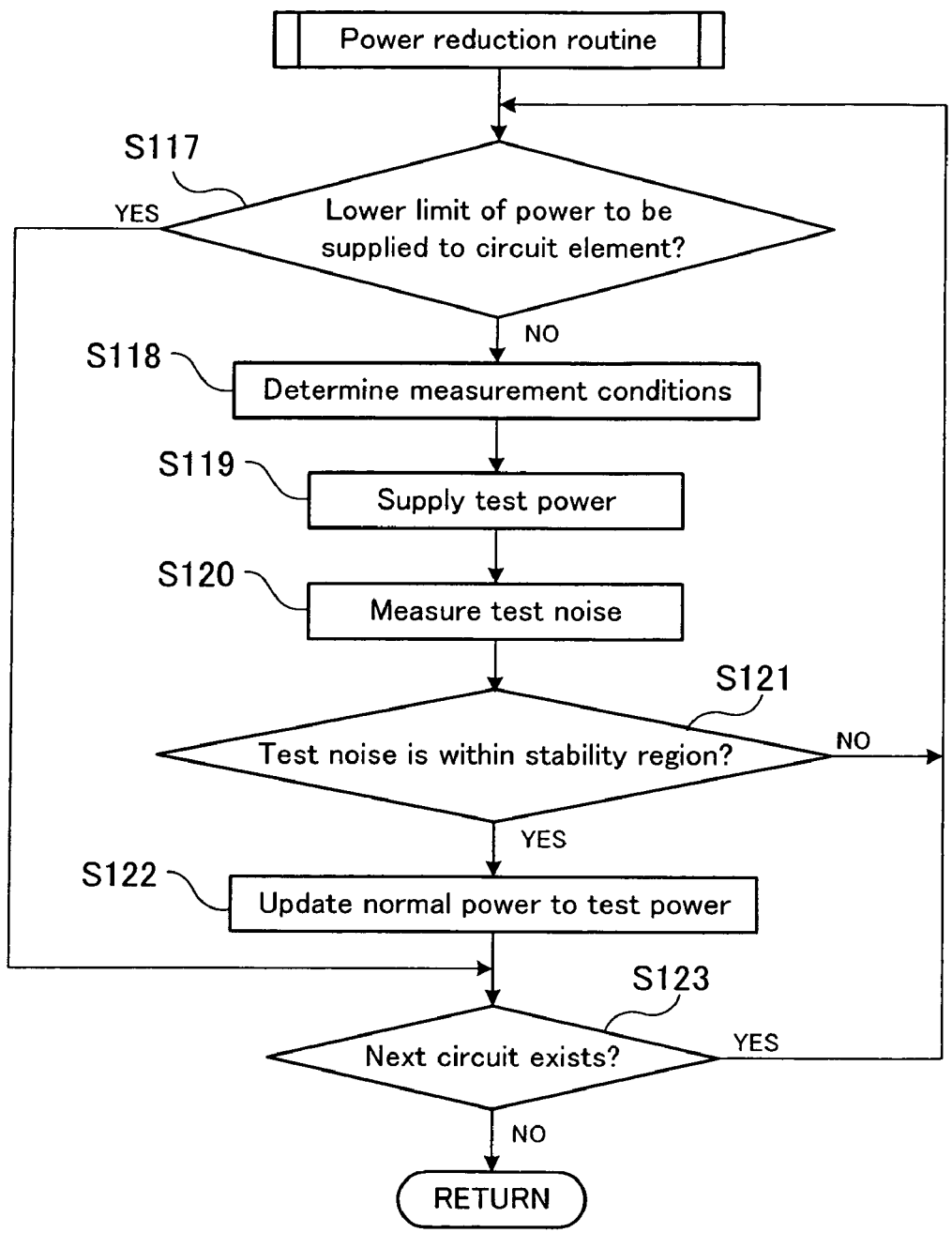
FIG. 16 is a flowchart showing a power reduction routine to be called in the flow of FIG. 14.

The flow of control to update the normal power according to the second embodiment will be described below. FIGS. 14 to 16 are flowcharts showing the flows of control. FIGS. 14 to 16 show a series of steps when the controller 304 updates one time the power to be supplied to each circuit element.

First, In Step S101, the power supply unit 100 supplies the current normal power to the RF amplifier unit 21 and so on over a predetermined time period as a second time period. In Step S102, the wave equalizing unit 37 measures the intensity of the noise contained in the signal Si output from the tuner 2 when the normal power is supplied. From MER measured by the wave equalizing unit 37, the measurement mean value calculating section 330 calculates a mean value of the CN ratio corresponding to the normal noise.

In Step S103, on the basis of the mean value calculated by the measurement mean value calculating section 330, the controller 304 judges whether or not the normal noise is not less than a predetermined reset value. The reset value has been set to a value more than the upper limit of the noise stability region. When the controller 304 has decided that the normal noise is not less than the reset value, that is, Yes in Step S103, the flow then advances to Step S106, in which the controller 304 updates the intensity of the normal power to a default value for any circuit element. The flow then ends. The default value has been set to a sufficiently high value so that the errors to be contained in the signal Si output from the tuner 2 surely fall within a range in which the errors can be corrected. That is, the default value has been set such that the intensity of the noise to be contained in the signal Si output from the tuner 2 has its value sufficiently lower than the upper limit of the stability region. For example, the default value may be set such that the intensity of the noise has its value lower than the lower limit of the stability region.

When the controller 304 decided in Step S103 that the normal noise is less than the reset value, that is, No in Step S103, the flow then advances to Step S104, in which the controller 304 judges whether or not the normal noise is not less than the upper limit of the stability region. When the controller 304 has decided that the normal noise is not less than the upper limit of the stability region, that is, Yes in Step S104, the flow then advances to Step S107, in which the controller 304 controls the noise improving section 350 to carry out a series of steps of a noise improvement routine as shown in FIG. 15.

When the controller 304 decided in Step S104 that the normal noise is less than the upper limit of the stability region, that is, No in Step S104, the flow then advances to Step S105, in which the controller 304 judges whether or not the normal noise is not more than the lower limit of the stability region. When the controller 304 has decided that the normal noise is not more than the lower limit of the stability region, that is, Yes in Step S105, the flow then advances to Step S108, in which the controller 304 controls the power reducing section 340 to carry out a series of steps of a power reduction routine as shown in FIG. 16. When the controller 304 has decided that the normal noise is more than the lower limit of the stability region, that is, No in Step S105, the flow then ends.

The noise improvement routine shown in FIG. 15 will be described below. In the noise improvement routine, the noise improving section 350 determines an update value for the normal power in sequence for the RF amplifier unit 21, the mixer unit 22, and so on, of the tuner 2, so as to improve the noise generated in the circuit element. First, in Step S109, the noise improving section 350 judges whether or not the current normal power is not less than the upper limit of the power to be supplied to the circuit element.

That is, for stable operation of each circuit element, the power to be supplied to the circuit element must not be too high. Thus, the circuit characteristic storage section 310 stores therein for each circuit the upper limit of the power to be supplied to the circuit element, for stable operation of the circuit element. The noise improving section 350 compares the normal power with the upper limit stored in the circuit characteristic storage section 310.

When the noise improving section 350 has decided that the normal power is not less than the upper limit of the power to be supplied to the circuit element, that is, Yes in Step S109, the flow then advances to Step S116 so that the noise improving section 350 carries out procedures in and after the Step S116. That is, the noise improving section 350 determines in the next circuit element an update value for the normal power so as to improve noise.

When the noise improving section 350 has decided that the normal power is less than the upper limit of the power to be supplied to the circuit element, that is, No in Step S109, the flow then advances to Step S110, in which the noise improving section 350 determines measurement conditions for measurement of test noise. At this time, the noise improving section 350 determines a test power, for example, to a value higher than the current normal power so as to reduce the noise contained in the signal Si output from the tuner 2.

Which of an increase and a decrease in the power to be supplied to a circuit element is required for reducing the noise contained in the signal Si output from the tuner 2, varies from circuit element to circuit element or in accordance with reception conditions such as presence or absence of an interfering wave. In general, an increase in the power to be supplied to a circuit element brings about a reduction of noise to be generated in the circuit element and an increase in toughness to interfering wave. In accordance with a circuit construction, however, a decrease in the power to be supplied may bring about a reduction of noise or an increase in toughness to interfering wave.

The circuit characteristic storage section 310 stores therein, for each circuit element, information as to which of an increase and a decrease in the power to be supplied to the circuit element is required for reducing noise. On the basis of the information stored in the circuit characteristic storage section 310, the noise improving section 350 determines a test power for a circuit element to a value higher than the normal power, and for another circuit element to a value lower than the normal power.

In Step S111, in accordance with the measurement conditions determined by the noise improving section 350, the power supply control section 360 controls the power supply unit 100 to supply the test power. In Step S112, the wave equalizing unit 37 measures the intensity of test noise when the test power is supplied to the circuit element. The measurement mean value calculating section 330 then calculates a mean value and so on of the CN ratio corresponding to the test noise.

In Step S113, on the basis of the mean value calculated by the measurement mean value calculating section 330, the noise improving section 350 compares the intensity of the test noise with the intensity of the normal noise. When the noise improving section 350 has decided that the intensity of the test noise is not less than the intensity of the normal noise, that is, No in Step S113, the flow then advances to Step S116 so that the noise improving section 350 carries out procedures in and after the Step S116.

As described above, it is judged in Step S113 whether or not the test noise is less than the normal noise, that is, whether or not the noise is actually improved by the update of the normal power. If the noise is not improved, an update value of the normal power to improve the noise is determined in the next circuit element. Thus, Steps S114 and S115 are omitted for the circuit element in which the noise is not improved even when the normal power is updated. This prevents unnecessary control.

When the noise improving section 350 decided in Step S113 that the intensity of the test noise is less than the intensity of the normal noise, that is, Yes in Step S113, the flow then advanced to Step S114, in which the noise improving section 350 judges whether or not the intensity of the test noise is within the stability region. That is, the noise improving section 350 judges whether or not the intensity of the test noise is less than the upper limit of the stability region and more than the lower limit of the stability region. When the noise improving section 350 has decided that the intensity of the test noise is not within the stability region, that is, No in Step S114, the flow then returns to Step S109 so that the noise improving section 350 again carries out the procedures in and after the Step S109 to measure test noise when a test power is supplied.

In this case, in Step S110 of determination of measurement conditions, the intensity of a test power is determined to a value that may make test noise more tend to be within the stability region, in comparison with the previous test power.

When the noise improving section 350 decided in Step S114 that the intensity of the test noise is within the stability region, that is, Yes in Step S114, the flow then advances to Step S115, in which the noise improving section 350 determines the update value for the normal power to the intensity of the test power, and the power supply control section 360 then controls the normal power storage section 102 to store therein the update value determined by the noise improving section 350.

The noise improving section 350 repeats for every circuit element the series of steps to determine an update value for the normal power, in this case, Yes in Step S116. When update values have been determined for all of the circuit elements for any of which an update value should be determined, that is, No in Step S116, the flow of this subroutine then returns to the main flow, that is, Step S107 of FIG. 14. The main flow then ends.

The power reduction routine shown in FIG. 16 will be described below. In the power reduction routine, the power reducing section 340 determines an update value for the normal power in sequence for the RF amplifier unit 21, the mixer unit 22, and so on, of the tuner 2, so as to reduce the power generated in the circuit element. First, in Step S117, the power reducing section 340 judges whether or not the current normal power is not more than the lower limit of the power to be supplied to the circuit element.

That is, for stable operation of each circuit element, the power to be supplied to the circuit element must not be too low. Thus, the circuit characteristic storage section 310 stores therein for each circuit the lower limit of the power to be supplied to the circuit element, for stable operation of the circuit element. The power reducing section 340 compares the normal power with the lower limit stored in the circuit characteristic storage section 310.

When the power reducing section 340 has decided that the normal power is not more than the lower limit of the power to be supplied to the circuit element, that is, Yes in Step S117, the flow then advances to Step S123 so that the power reducing section 340 carries out procedures in and after the Step S123. That is, the power reducing section 340 determines in the next circuit element an update value for the normal power so as to improve noise.

When the power reducing section 340 has decided that the normal power is more than the lower limit of the power to be supplied to the circuit element, that is, No in Step S117, the flow then advances to Step S118, in which the power reducing section 340 determines measurement conditions for measurement of test noise. At this time, the power reducing section 340 determines the intensity of a test power to a value lower than the current normal power.

In Step S119, in accordance with the measurement conditions determined by the power reducing section 340, the power supply control section 360 controls the power supply unit 100 to supply the test power. In Step S120, the wave equalizing unit 37 measures the intensity of test noise when the test power is supplied to the circuit element. The measurement mean value calculating section 330 then calculates a mean value and so on of the CN ratio corresponding to the test noise.

In Step S121, the power reducing section 340 judges whether or not the intensity of the test noise is within the stability region. That is, the power reducing section 340 judges whether or not the intensity of the test noise is less than the upper limit of the stability region and more than the lower limit of the stability region. When the power reducing section 340 has decided that the intensity of the test noise is not within the stability region, that is, No in Step S121, the flow then returns to Step S117 so that the power reducing section 340 again carries out the procedures in and after the Step S117 to measure test noise when a test power is supplied. In this case, in Step S118 of determination of measurement conditions, the intensity of a test power is determined to a value that may make test noise more tend to be within the stability region, in comparison with the previous test power.

When the power reducing section 340 decided in Step S121 that the intensity of the test noise is within the stability region, that is, Yes in Step S121, the flow then advances to Step S122, in which the power reducing section 340 determines the update value for the normal power to the intensity of the test power, and the power supply control section 360 then controls the normal power storage section 102 to store therein the update value determined by the power reducing section 340.

The power reducing section 340 repeats for every circuit element the series of steps to determine an update value for the normal power, in this case, Yes in Step S123. When update values have been determined for all of the circuit elements for any of which an update value should be determined, that is, No in Step S123, the flow of this subroutine then returns to the main flow, that is, Step S108 of FIG. 14. The main flow then ends.

In the above-described manner, the normal power is updated so that the intensity of the noise contained in the signal Si output from the tuner 2 is within the stability region. That is, the power to be supplied to each circuit element is controlled so that the errors to be contained in the signal Si fall within a range in which the errors can be corrected, and the power to be supplied does not increase more than necessity. If the lower limit of the stability region is too close to the upper limit, the control of the whole of the digital demodulating apparatus 1 may become unstable because the stability region is too narrow and the number of times of updates for the normal power increases. On the other hand, if the lower limit of the stability region is too low, sufficient effect of the reduction of the power to be supplied can not be obtained. For this reason, the lower limit of the stability region is preferably adjusted so that the control of the whole of the digital demodulating apparatus 1 falls within a stable range and the sufficient effect of the reduction of the power to be supplied can be obtained.

In addition, a test power is actually supplied to each circuit element to measure test noise contained in the signal Si output from the tuner 2; it is judged whether or not the intensity of the test noise is within the stability region; and then the intensity of the normal power is updated to the intensity of the test power. That is, because the normal power is updated on the basis of the judgment by the actual measurement of noise as to whether or not the noise is within the stability region, the power to be supplied can be controlled so that the intensity of the noise is more surely within the stability region.

In addition, on the basis of whether or not the normal noise is not less than the upper limit of the stability region, or whether or not the normal noise is not more than the lower limit of the stability region, it is decided that updating of the normal power to improve the noise should be performed, or that updating of the normal power to reduce the power to be supplied should be performed. Therefore, when the errors to be contained in the signal Si output from the tuner 2 are not within a range in which the errors can be corrected, updating of the normal power that makes the errors fall within the range in which the errors can be corrected, is ensured. In addition, when the intensity of the errors to be contained in the signal Si output from the tuner 2 is sufficiently lower than the range in which the errors can be corrected, updating of the normal power to reduce the power to be supplied is ensured.

Third Embodiment

Figure 17A:
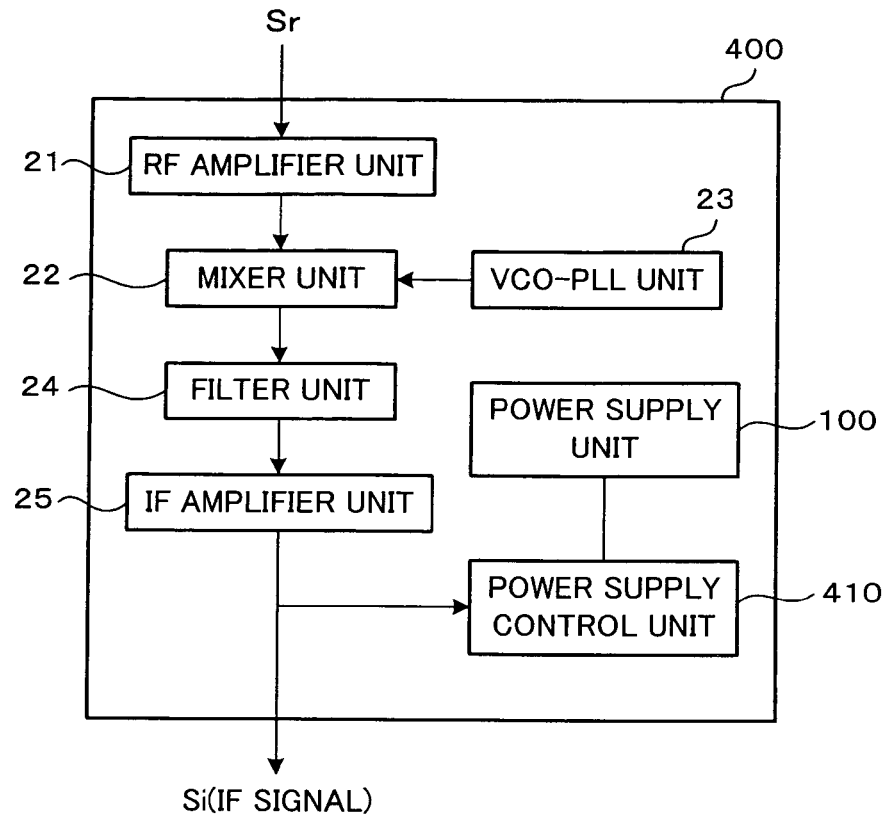
FIG. 17A is a block diagram showing an example of a construction of a tuner according to still another embodiment of the present invention.

A third embodiment of the present invention will be described below in which the features of the present invention is realized singly by a tuner. FIG. 17A is a block diagram showing a construction of a tuner 400 according to the third embodiment. As shown in FIG. 17A, the tuner 400 includes therein circuit elements such as an RF amplifier unit 21, a mixer unit 22, a VCO-PLL unit 23, a filter unit 24, and an IF amplifier unit 25, like the tuner 2 according to the first or second embodiment. The tuner 400 further includes therein a power supply unit 100, which is the same as that of the first embodiment.

Figure 17B:
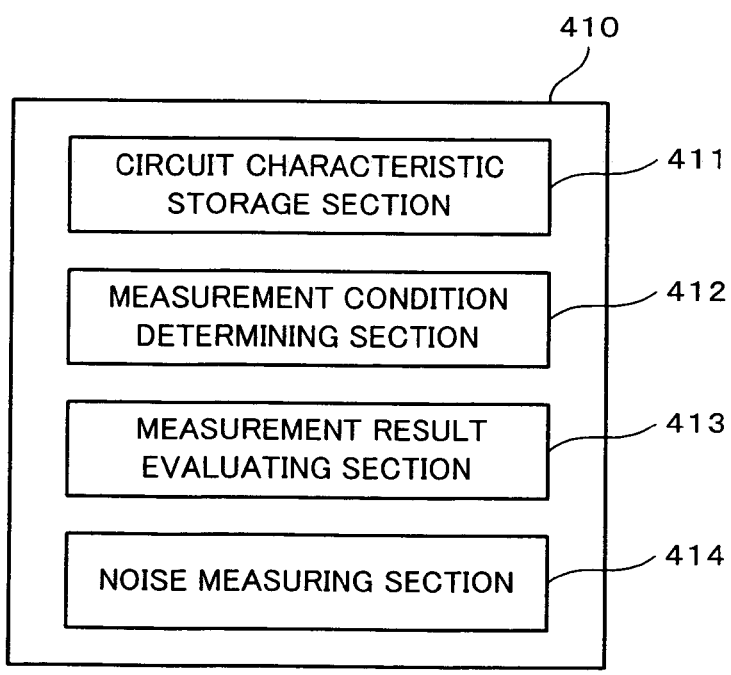
FIG. 17B is a block diagram showing a construction of a power supply control unit shown in FIG. 17A.

The tuner 400 further includes therein a power supply control unit 410. As shown in FIG. 17B, the power supply control unit 410 is similar in function to the controller 4 included in the demodulator 3 of the first embodiment. The power supply control unit 410 controls the power supply unit 100 to supply a test power or a normal power to each circuit element. More specifically, the power supply control unit 410 includes therein a circuit characteristic storage section 411, a measurement condition determining section 412, and a measurement result evaluating section 413. Like the first embodiment, the circuit characteristic storage section 411 stores therein information on characteristics of each circuit element; the measurement condition determining section 412 determines measurement conditions such as the intensity of a test power; and the measurement result evaluating section 413 specifies a critical power and determines an update value for the normal power. On the basis of the measurement conditions determined by the measurement condition determining section 412, the power supply control unit 410 controls the power supply unit 100 to supply a test power. In addition, the power supply control unit 410 updates the value stored in the normal power storage section 102 of the power supply unit 100, to the update value determined by the measurement result evaluating section 413.

On the other hand, the tuner 400 is constructed so that the signal Si output from the IF amplifier unit 25 is also input to the power supply control unit 410. The power supply control unit 410 includes therein a noise measuring section 414, differently from the controller 4. The noise measuring section 414 measures the power of a frequency band of a target wave contained in the signal Si sent from the IF amplifier unit 25. The noise measuring section 414 judges whether or not the power of the frequency band has sharply increased when a test power is supplied, in comparison with the case wherein the normal power is being supplied. Because a change in the noise other than the interference noise is little as described before, the power increased in the frequency band of the target wave by the supply of the test power corresponds to the power increased due to the interference noise. Thus, the noise measuring section 414 measures the increased power to detect the intensity of the noise on the basis of the intensity of the power. The measurement result evaluating section 413 determines an update value for the normal power on the basis of the intensity of the noise detected by the noise measuring section 414.

As described above, in the third embodiment, the intensity of the noise contained in the signal after channel select processing, output from the tuner, and then the normal power is updated. Thus, there is no need of combination with the demodulator 3 to realize the features of the present invention. The present invention is realized by a simple construction. Further, because there is no need of constructing the tuner on the assumption of combination with a specific demodulator 3, the tuner 2 can be constructed so as to be able to select proper settings in accordance with combination with various demodulators.

In the third embodiment, in place of the measurement result evaluating section 413, a power reducing section 340 and a noise improving section 350 according to the third embodiment may be provided so that a power supply control according to the third embodiment may be performed like that shown in FIGS. 14 to 16. In this case, however, because the measurement of the normal noise can not be carried out only by the tuner, the control only according to the measurement of the test noise is performed by the tuner.

Fourth Embodiment

Figure 18A:
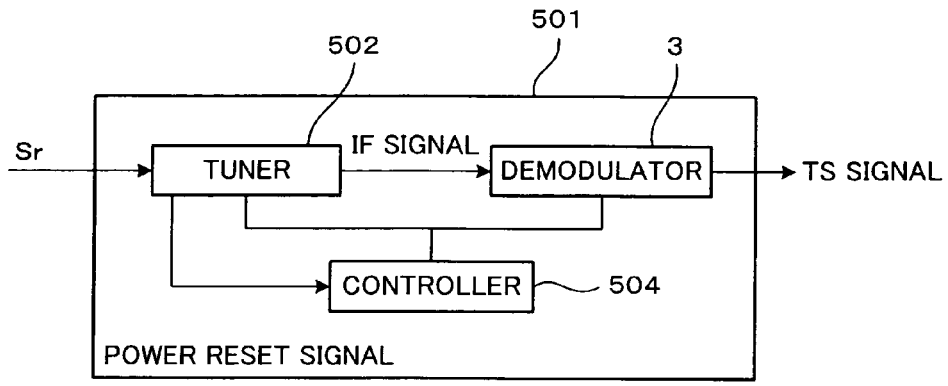
FIG. 18A is a block diagram showing an example of a construction of a digital demodulating apparatus according to still another embodiment of the present invention.
Figure 18B:
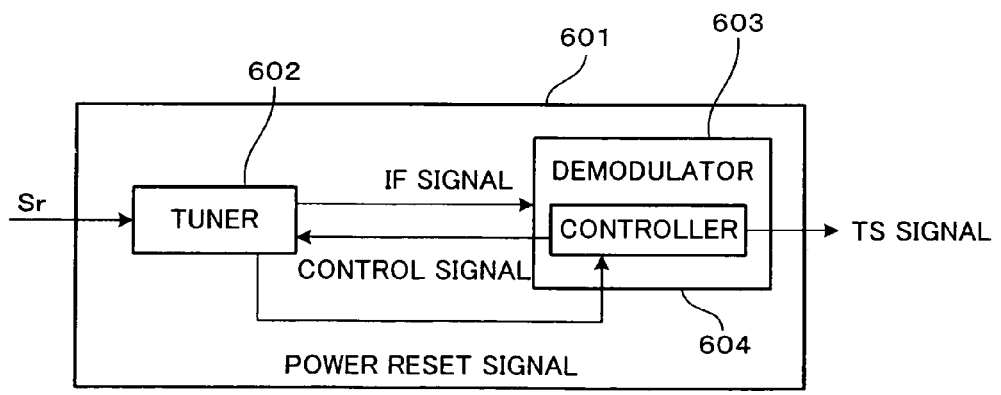
FIG. 18B is a block diagram showing a modification of the digital demodulating apparatus of FIG. 18A.

A fourth embodiment of the present invention will be described below in which the construction of the above-described first or second embodiment is changed or a new component is added to the construction of the first or second embodiment. In the fourth embodiment, the same components as in the first or second embodiment are denoted by the same reference numerals as in the first or second embodiment, respectively, and the description of them may be arbitrarily omitted. FIGS. 18A and 18B are block diagrams showing functional constructions of digital demodulating apparatuses 501 and 601 according to the fourth embodiment. As shown in FIG. 18A, a tuner 502 of this embodiment sends to a controller 504 a power reset signal as will be described later. In this embodiment, as shown in FIG. 18B, a controller 604 may be provided in a demodulator 603. In this case, a tuner 602 is controlled on the basis of a control signal sent from the controller 604.

Figure 19:
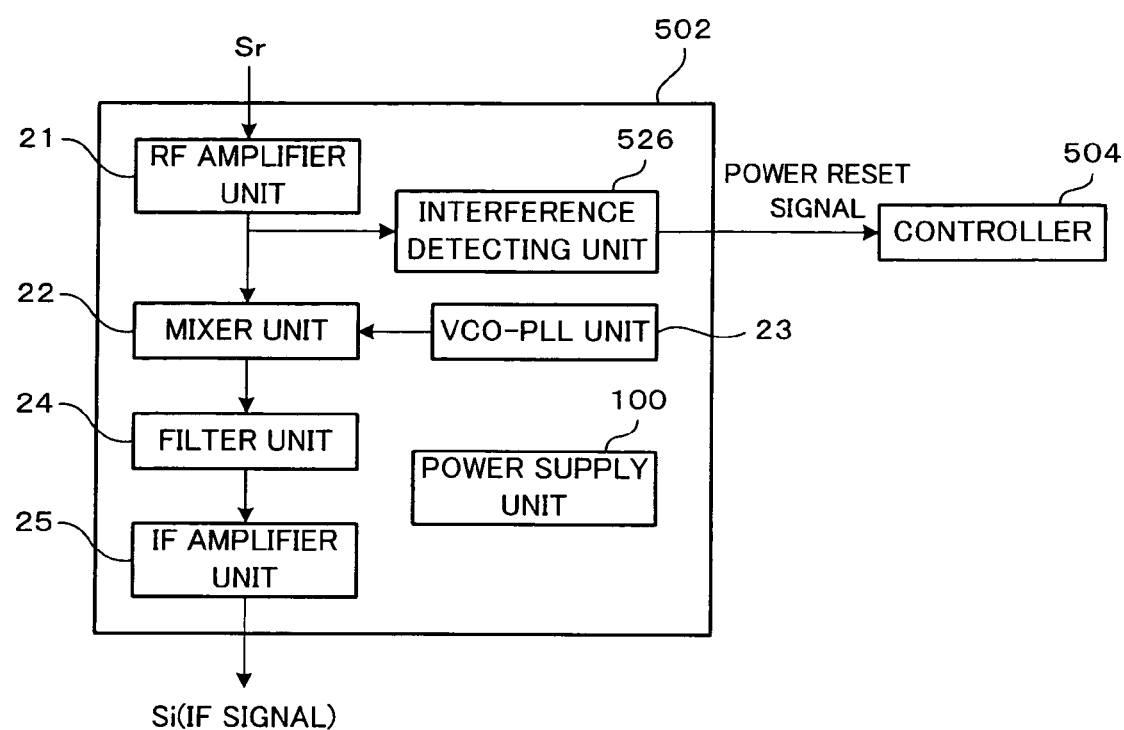
FIG. 19 is a block diagram showing a construction of a tuner showing in FIG. 18A.

FIG. 19 is a block diagram showing a functional construction of the tuner 502. The tuner 502 includes therein an interference detecting unit 526 in addition to the construction of the tuner of the first or second embodiment. The interference detecting unit 526 performs analyzation as to whether or not the signal output from the RF amplifier unit 21 contains an interfering wave. For example, the interference detecting unit 526 measures the intensity of the signal sent from the RF amplifier unit 21, to judge how much the intensity has increased in a predetermined time period. When the interference detecting unit 526 has decided that the increase in the intensity of the signal exceeds a predetermined threshold, then the interference detecting unit 526 decides that the signal output from the RF amplifier unit 21 contains an interfering wave. When the received signal of the tuner 502 contains an intense interfering wave, the intensity of the received signal sharply increases. Thus, by judging whether or not the intensity of the received signal has increased in the predetermined time period to exceed the threshold, it can be detected that the reception conditions have rapidly varied due to mixing of an interfering wave.

When the interference detecting unit 526 has decided that the signal output from the RF amplifier unit 21 contains an interfering wave, the interference detecting unit 526 sends to the controller 504 a power reset signal indicating that an interfering wave is contained, in this case, the power reset signal serves as an interference presence signal. When the interference detecting unit 526 has decided that the signal output from the RF amplifier unit 21 contains no interfering wave, the interference detecting unit 526 sends to the controller 504 a power reset signal indicating that no interfering wave is contained, in this case, the power reset signal serves as an interference absence signal. The interference detecting unit 526 always monitors the signal sent from the RF amplifier unit 21 to judge whether or not the signal contains an interfering wave. That is, the power reset signal is always being sent to the controller 504. In a modification, the interference detecting unit 526 may be constructed so as to send a signal when the interference detecting unit 526 has decided that an interfering wave is contained, and to send no signal when the interference detecting unit 526 has decided that no interfering wave is contained.

Figure 20:
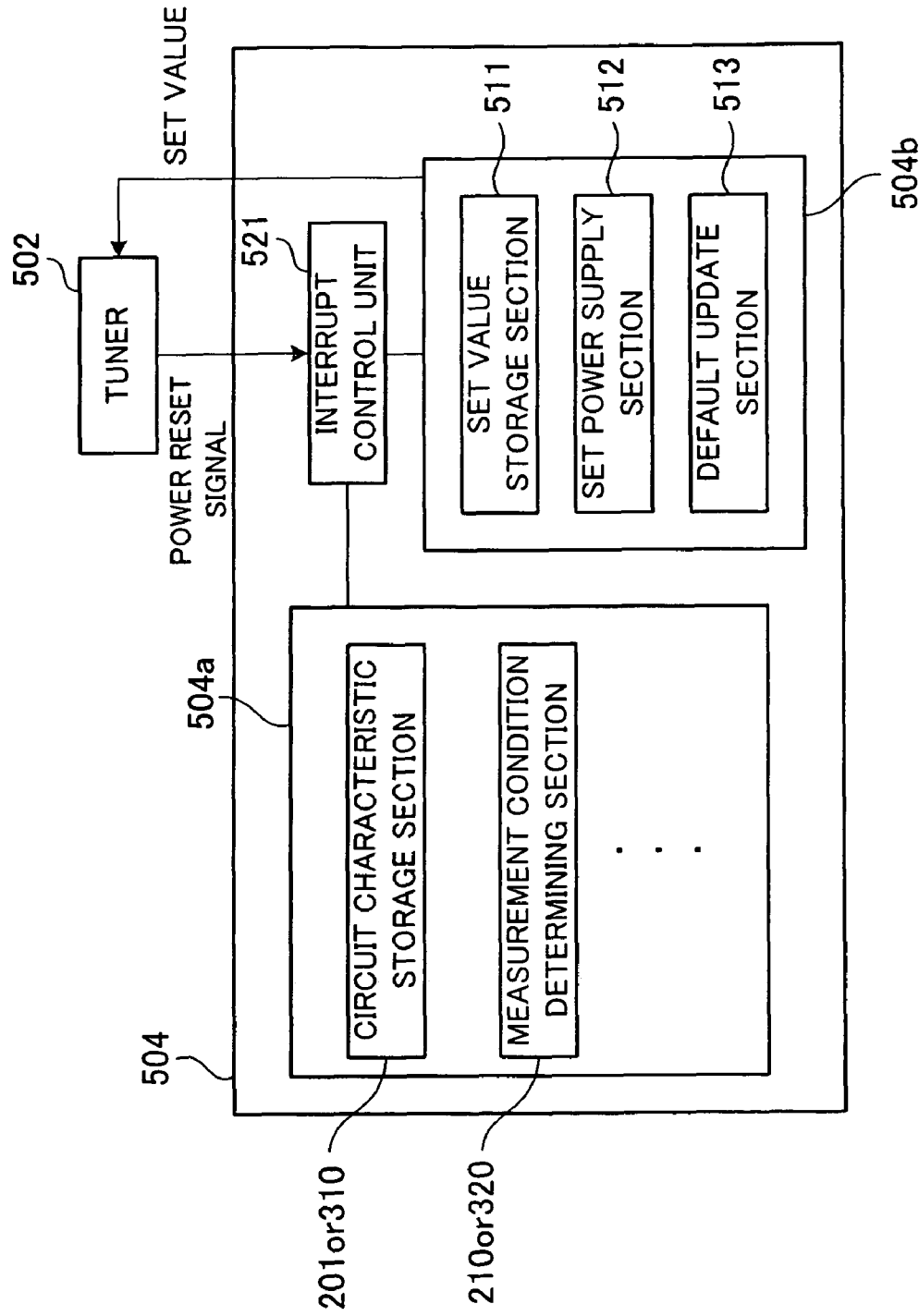
FIG. 20 is a block diagram showing a construction of a controller shown in FIG. 18A.

FIG. 20 is a block diagram showing a functional construction of the controller 504. The controller 504 includes therein a power update control unit 504a, a set power supply control unit 504b, and an interrupt control unit 521.

Figure 13:
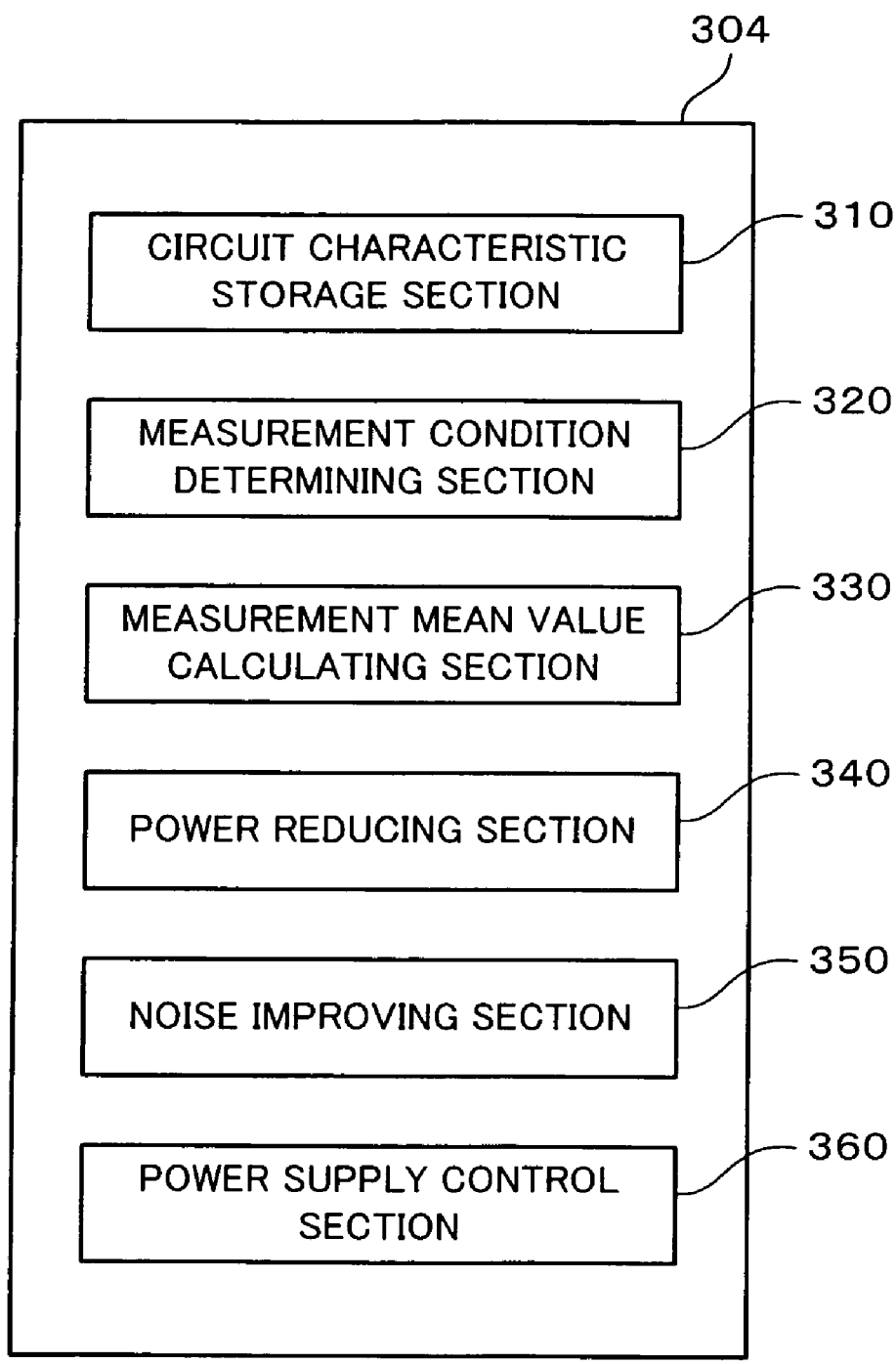
FIG. 13 is a block diagram showing an example of a construction of a controller according to another embodiment of the present invention.

The power update control unit 504a has the same construction as the controller 4 of the first embodiment as shown in FIG. 10 or the controller 304 of the second embodiment as shown in FIG. 13. The set power supply control unit 504b includes therein a set value storage section 511, a set power supply section 512, and a default update section 513. The set value storage section 511 stores therein a set value of power. The set value indicates a power that has been controlled with making it a top priority to reduce the noise to be contained in the signal output from the tuner 502. The set power supply section 512 sends to the power supply unit 100 an instruction signal to instruct the power supply unit 100 to supply to a predetermined circuit element a power of the intensity corresponding to the set value stored in the set value storage section 511. On the basis of the instruction signal, the power supply unit 100 supplies to the predetermined circuit element the power of the intensity corresponding to the set value.

In this embodiment, as the predetermined circuit element, a circuit element has been selected the supply of the power of the intensity corresponding to the set value, to the circuit element, brings about a reduction of the noise to be contained in the signal output from the tuner 502. By supplying to the predetermined circuit element the power of the intensity corresponding to the set value, for example, the power to be used for tuning after changing the channel is increased. In a modification, however, the set value storage section 511 may store therein a number of set values with relating to the corresponding circuit elements, respectively, and the set power supply section 512 may have the construction to supply the set values stored in the set value storage section 511, to the respective circuit elements stored in the set value storage section 511 with relating to the respective set values.

The default update section 513 updates the intensity of the normal power being held in the power supply unit 100, to a predetermined default value. The default value at this time may be the same as the set value stored in the set value storage section 511.

On the basis of the power reset signal sent from the interference detecting unit 526, the interrupt control unit 521 interrupts processing being carried out by the power update control unit 504a and so on, to insert processing by the set power supply control unit 504b. At intervals of a predetermined time period, the interrupt control unit 521 is checking as to whether the power reset signal is indicating that the received signal of the tuner 502 contains an interfering wave or that the received signal contains no interfering wave. After a predetermined times of checks, the interrupt control unit 521 judges whether or not the power reset signal indicated in any of the checks that an interfering wave is contained, in this case, the interrupt control unit 521 serves as a check judging unit.

When the interrupt control unit 521 has decided that the power reset signal indicated in any of the predetermined times of checks that an interfering wave is contained, the interrupt control unit 521 interrupts processing by the power update control unit 504*a* and so on, to insert processing by the set power supply control unit 504*b*. For example, when the controller 504 is realized by hardware such as a CPU, a RAM, and so on, the CPU works on the basis of a computer program that causes the CPU to function as the power update control unit 504*a*. When the interrupt control unit 521 has decided that the power reset signal indicated in any of the checks that an interfering wave is contained, the interrupt control unit 521 temporarily stops the work of the CPU and then makes the CPU work on the basis of a computer program that causes the CPU to function as the set power supply control unit 504*b*. When the set power supply control unit 504*b* has decided that the power reset signal indicates that no interfering wave is contained, the set power supply control unit 504*b* instructs the interrupt control unit 521 to restart its work. When received the instruction, the interrupt control unit 521 makes the CPU restart the work that has been temporarily stopped.

In a modification, in place of the above-described construction in which interrupt is carried out only when the power reset signal indicates in any of the predetermined number of checks that an interfering wave is contained, the interrupt control unit 521 may have the following construction. That is, the interrupt control unit 521 may be constructed so as to insert processing by the set power supply control unit 504*b* when the power reset signal indicated in at least one of the checks that an interfering wave is contained.

Figure 21:
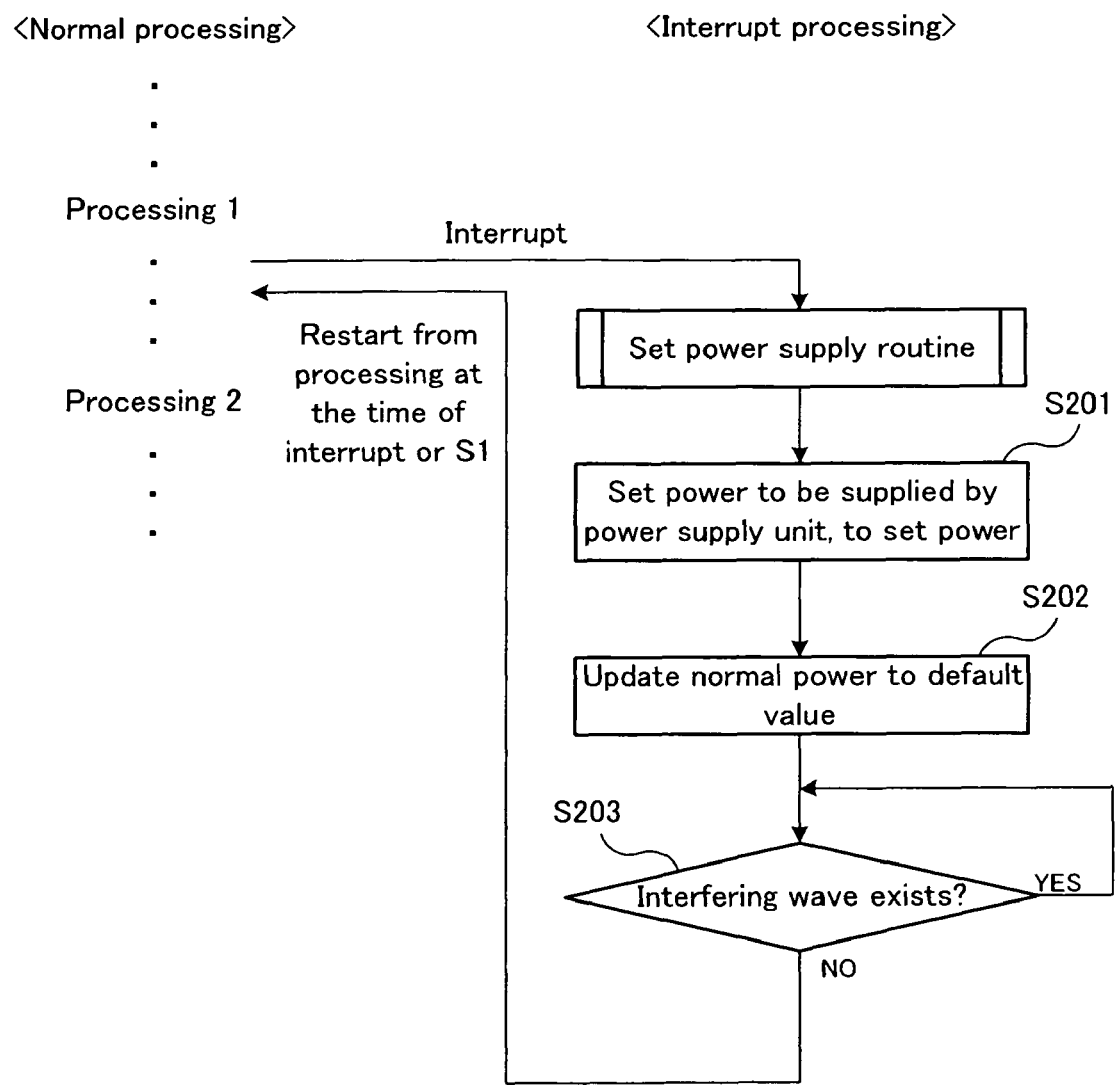
FIG. 21 is a flowchart showing a series of steps to be performed by the controller of FIG. 20.

FIG. 21 shows the flow of procedure to be performed by the controller 504. The left part of FIG. 21 shows normal processing to be performed by the power update control unit 504*a* and so on, and the right part shows the flow of a ser power supply routine to be performed by the set power supply control unit 504*b*. On the basis of the power reset signal sent from the interference detecting unit 526, the interrupt control unit 521 controls the CPU, which constitutes the controller 504, to stop the normal processing and carry out the set power supply routine so that the CPU serves as the set power supply control unit 504*b*. At this time, when processing by the power update control unit 504*a* was being carried out as the normal processing, the processing by the power update control unit 504*a* for updating power is once stopped.

In the set power supply routine, first, in Step S201, the set power supply control unit 504*b* sets the power to be supplied to each circuit element by the power supply unit 100, to the intensity of the set value stored in the set value storage section 511. In Step S202, the set power supply control unit 504*b* updates the intensity of the normal power being held by the power supply unit 100, to a predetermined default value. In Step S203, the set power supply control unit 504*b* judges whether or not the power reset signal being sent from the interference detecting unit 526 indicates that an interfering wave is contained. When the set power supply control unit 504*b* has decided that the power reset signal indicates that an interfering wave is contained, that is, Yes in Step S203, the processing of Step S203 is repeated. When the set power supply control unit 504*b* has decided that the power reset signal does not indicate that an interfering wave is contained, that is, No in Step S203, the set power supply control unit 504*b* instructs the interrupt control unit 521 to restart the normal processing by the power update control unit 504*a* and so on.

In this embodiment, when one of the steps of FIG. 12 was being carried out immediately before the set power supply routine is started, that is, immediately before interrupt, the flow restarts from Step S1 of FIG. 12 after the interrupt. When one of the steps of FIGS. 14 to 16 was being carried out before the interrupt, the flow restarts from Step S101 of FIG. 14 after the interrupt.

<Effect of Fourth Embodiment>

In the first to third embodiments as described before, the power to be supplied is controlled in accordance with reception conditions so that the power to be supplied does not increase more than necessity. However, a reception condition may rapidly become bad in a degree that the control of the power to be supplied can not be performed in time. Even in this case, according to a feature of the fourth embodiment, when an interfering wave is detected, the power to be supplied to each circuit element is rapidly reset by interrupt processing. Because the set value indicates a power that has been controlled with making it a top priority to reduce the noise to be contained in the signal output from the tuner 502, the noise can be rapidly reduced in exchange for an increase in power consumption. Thus, even when an interfering wave is rapidly input, the demodulator 3 can keep its IF output at a level at which the output signal can successfully be demodulated. This makes it possible to prevent interruption of signal reception.

The normal power is set to a default value in the interrupt processing. After the interrupt processing, newly from the default value, the power update processing as shown in FIG. 12 and so on is carried out from the beginning. Thus, after an interfering wave disappears, not the state of the power consumption returns to the low power consumption state before the interfering wave is input, but the power reduction processing is started newly from the default power. Immediately after the interfering wave disappears, if the tuner is set to the low power consumption state before the interfering wave is input, there is a fear that the IF output becomes impossible to be demodulated and this causes interruption of signal reception. However, by restarting the power updating from the default power, the above problem can be avoided.

From the viewpoint of preventing interruption of signal reception as much as possible, when an interfering wave is detected, the power to be supplied to each circuit element is preferably increased as rapidly as possible, to shift to a state wherein the noise has been reduced. Thus, for the purpose of rapidly shifting to the interrupt processing when the power reset signal has indicated that the received signal of the tuner contains an interfering wave, it is effective to set a higher priority of the interrupt processing than the normal processing.

In accordance with reception conditions, however, the power reset signal being sent from the interference detecting unit 526 may frequently change between a state of indicating that an interfering wave is contained, and a state of indicating that no interfering wave is contained. When the power reset signal thus frequently changes, the interrupt control unit 521 frequently repeats interrupt processing. This brings about frequent repeats of setting by the set power supply control unit 504 the power to be supplied to each circuit element, and setting by the power update control unit 504*a* the power to be supplied to each circuit element. In this case, the power consumption may increase because the operation frequency of the controller 504 increases.

According to a feature of the fourth embodiment as described above, however, the interrupt control unit 521 performs a number of times of checks at intervals of a predetermined time period as to whether or not the power reset signal is indicating that an interfering wave is contained. On the basis of the times of checks, the controller 521 judges whether or not interrupt processing should be performed. Thus, in comparison with a case wherein it is judged by each check whether or not interrupt processing should be performed, the frequency of occurrence of interrupt processing can be suppressed. As described above, the fourth embodiment can selectively have two features of the feature that interrupt processing is performed when the power reset signal indicated in any of the times of checks that an interfering wave is contained, and the feature that the power reset signal indicated in at least one of the times of checks that an interfering wave is contained. Which of the features should be selected is preferably decided in consideration of conditions inherent to an individual system, such as the waveform of the power reset signal and the cycle of change in the power reset signal.

Fifth Embodiment

Figure 22A:
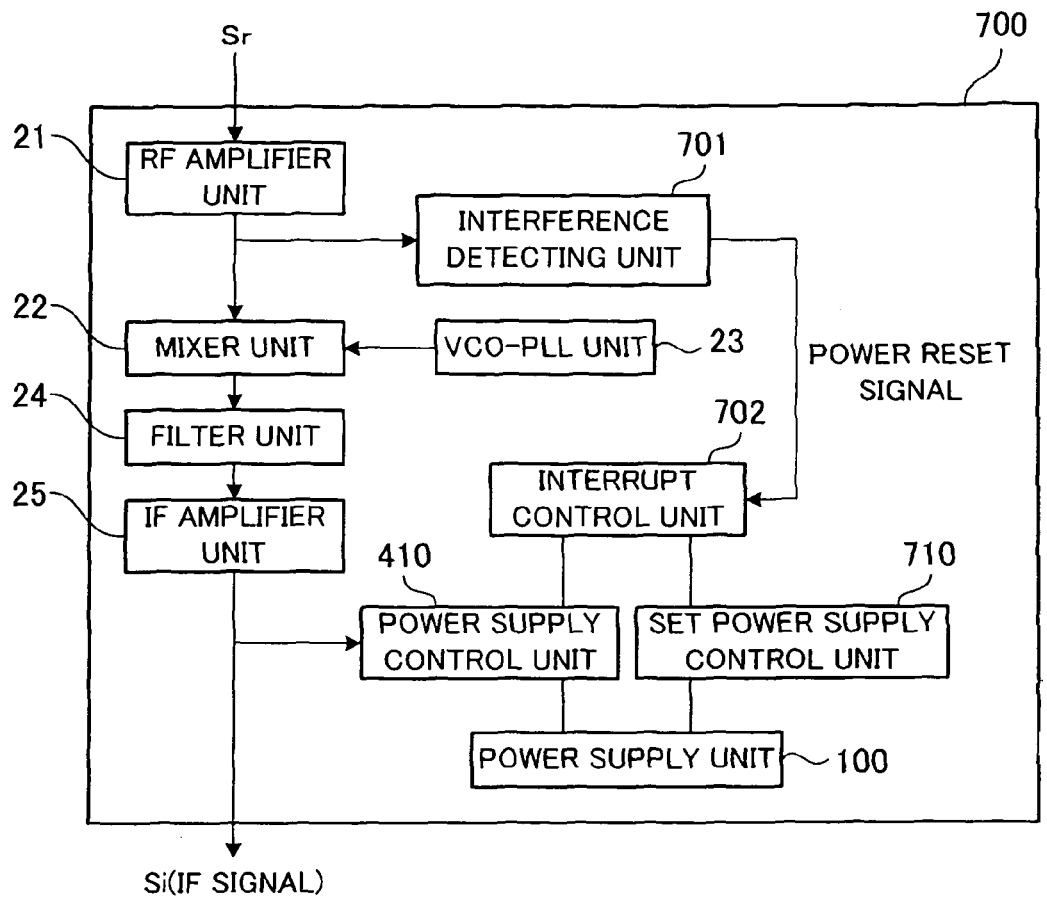
FIG. 22A is a block diagram showing an example of a construction of a tuner according to still another embodiment of the present invention.

A fifth embodiment of the present invention will be described below in which the features of the fourth embodiment is realized singly by a tuner. The fifth embodiment is constructed by adding the characteristic features of the fourth embodiment to the features of the third embodiment. In the fifth embodiment, the same components as in the third and fourth embodiments are denoted by the same reference numerals as in the third and fourth embodiments, respectively, and the description of them may be arbitrarily omitted. FIG. 22A is a block diagram showing a functional construction of a tuner 700 according to the fifth embodiment.

As shown in FIG. 22A, the tuner 700 includes therein an interference detecting unit 701, an interrupt control unit 702, and a set power supply control unit 710. These units have the same functions as the interference detecting unit 526, the interrupt control unit 521, and the set power supply control unit 504b of the fourth embodiment, respectively. More specifically, the interference detecting unit 701 judges whether or not the signal output from the RF amplifier unit 21 contains an interfering wave; and outputs a power reset signal to the interrupt control unit 702. On the basis of the power reset signal, the interrupt control unit 702 interrupts processing by the power supply control unit 410 and so on; and inserts processing by the set power supply control unit 710.

Figure 22B:
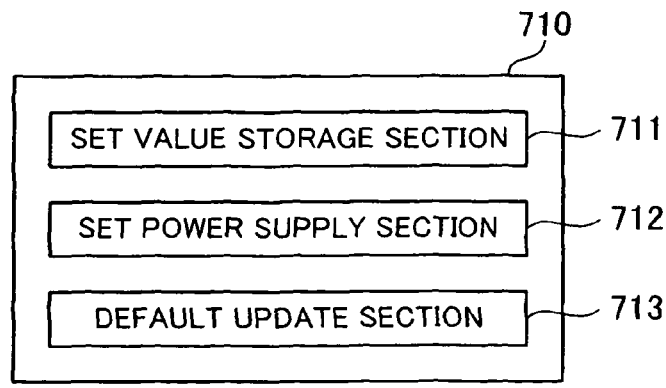
FIG. 22B is a block diagram showing a construction of a set power supply control unit shown in FIG. 22A.

As shown in FIG. 22B, the set power supply control unit 710 includes therein a set value storage section 711, a set power supply section 712, and a default update section 513. These sections correspond to the set value storage section 511, the set power supply section 512, and the default update section 513 of the fourth embodiment, respectively. More specifically, in interrupt processing, the set power supply section 712 sends to the power supply unit 100 a signal to instruct the power supply unit 100 to supply to each circuit element a power of an intensity corresponding to the set value stored in the set value storage section 711. The default update section 713 set the intensity of the normal power being held by the power supply unit 100, to a predetermined default value. Further, after waiting till the power reset signal indicates that no interfering wave is contained, the set power supply control unit 710 instructs the interrupt control unit 521 to end the interrupt processing so that the normal processing is restarted.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A tuner that performs channel select processing to a signal, the tuner comprising:
   a plurality of circuit elements;
   a power supply unit that supplies a normal power to each circuit element, and supplies to the circuit element a test power different from the normal power, over a first time period in place of the normal power;
   a test noise measuring unit that measures the intensity of test noise contained in a signal after channel select processing to be output from the tuner, when the power supply unit supplies the test power over the first time period;
   a comparing unit that compares the intensity of the test noise measured by the test noise measuring unit with a noise reference value as a reference for update of the normal power; and
   a power updating unit that updates the intensity of the normal power on the basis of a result of the comparison by the comparing unit, wherein the power updating unit comprising:
   a power reduction updating section that updates the intensity of the normal power to an intensity not less than the test power and less than the normal power when the power supply unit supplies to each circuit element the test power less than the normal power, over the first time period, and the result of the comparison by the comparing unit indicates that the intensity of the test noise is not more than the noise reference value.

2. The tuner according to claim 1, wherein the power updating unit comprising:
   a noise improvement updating section that updates the intensity of the normal power to an intensity, which is in between the test power and the normal power and different from the normal power before updating, when the power supply unit supplies to each circuit element over the first time period the test power that brings about a reduction of the noise contained in the signal after channel select processing to be output from the tuner, in comparison with the noise when the power supply unit supplies the normal power to the circuit element, and the result of the comparison by the comparing unit indicates that the intensity of the test noise is not more than the noise reference value.

3. The tuner according to claim 1,
   wherein the upper and lower limits of a noise stability region have been set as noise reference values, and
   the tuner further comprises:
   a normal noise measuring unit that measures the intensity of normal noise contained in a signal after channel select processing to be output from the tuner, in a second time period different from the first time period, when the power supply unit supplies the normal power to each circuit element over the second time period; and
   an update selecting unit that causes the power reduction updating section to update the normal power when the intensity of the normal noise measured by the normal noise measuring unit is not more than the lower limit of the stability region, and causes a noise improvement updating section to update the normal power when the intensity of the normal noise measured by the normal noise measuring unit is not less than the upper limit of the stability region.

4. A digital demodulating apparatus comprising:
a tuner constituted by a plurality of circuit elements to perform channel select processing to a signal;
a demodulator that performs demodulation processing to a signal output from the tuner;
a power supply unit that supplies a normal power to each circuit element, and supplies to the circuit element a test power different from the normal power, over a first time period in place of the normal power;
a test noise measuring unit that measures the intensity of test noise contained in a signal to be output from the tuner, when the power supply unit supplies the test power over the first time period;
a comparing unit that compares the intensity of the test noise measured by the test noise measuring unit with a noise reference value as a reference for updating of the normal power; and
a power updating unit that updates the intensity of the normal power on the basis of a result of the comparison by the comparing unit, wherein the power updating unit comprising:
a power reduction updating section that updates the intensity of the normal power to an intensity not less than the test power and less than the normal power when the power supply unit supplies to each circuit element the test power less than the normal power, over the first time period, and the result of the comparison by the comparing unit indicates that the intensity of the test noise is not more than the noise reference value.

5. The digital demodulating apparatus according to claim 4,
wherein the upper and lower limits of a noise stability region have been set as noise reference values, and
the digital demodulating apparatus further comprises:
a normal noise measuring unit that measures the intensity of normal noise contained in a signal after channel select processing to be output from the tuner, in a second time period different from the first time period, when the power supply unit supplies the normal power to each circuit element over the second time period; and
an update selecting unit that causes the power reduction updating section to update the normal power when the intensity of the normal noise measured by the normal noise measuring unit is not more than the lower limit of the stability region, and causes a noise improvement updating section to update the normal power when the intensity of the normal noise measured by the normal noise measuring unit is not less than the upper limit of the stability region.

6. The apparatus according to claim 4, wherein each circuit element has a circuit characteristic that a decrease in the power to be supplied to the circuit element when an input signal to the circuit element contains an interfering wave, brings about an increase in interference noise caused by the interfering wave, in the noise contained in an output signal from the circuit element, and a critical power, which is the power to be supplied, when the intensity of the noise to be contained in the output signal from the circuit element exceeds a noise permissible value, varies in accordance with the amplitude of the interfering wave, and the apparatus further comprises: a normal noise measuring unit that measures the intensity of normal noise contained in a signal after channel select processing to be output from the tuner, in a second time period different from the first time period, when the power supply unit supplies the normal power to each circuit element over the second time period; a relation deriving unit that derives a relation between the intensity of the power to be supplied to each circuit element and the intensity of the interference noise, on the basis of the intensity of the normal noise measured by the normal noise measuring unit and the intensity of the test noise measured by the test noise measuring unit, when the result of the comparison by the comparing unit indicates that the intensity of the test noise exceeds the noise permissible value; and a critical power deriving unit that derives the intensity of the critical power on the basis of the relation between the intensity of the power to be supplied and the intensity of the interference noise, derived by the relation deriving unit, and the power reduction updating section updates the intensity of the normal power to an intensity not less than the intensity of the critical power derived by the critical power deriving unit, and less than the normal power before updating.

7. The apparatus according to claim 6, wherein the relation deriving unit derives the relation between the intensity of the power to be supplied to each circuit element and the intensity of the interference noise, on the assumption that the difference between the intensity of the test noise measured by the test noise measuring unit and the intensity of the normal noise measured by the normal noise measuring unit is equal to the intensity of the interference noise, when the result of the comparison by the comparing unit indicates that the test noise exceeds the noise permissible value.

8. The apparatus according to claim 7, wherein each circuit element has a circuit characteristic that the intensity of the interference noise asymptotically gets near to zero as the power to be supplied to the circuit element increases.

9. The apparatus according to claim 7, wherein each circuit element has a circuit characteristic that at least one of intermodulation distortion and cross-modulation distortion is generated due to the interfering wave.

10. The apparatus according to claim 9, wherein the apparatus further comprises a circuit characteristic storage unit that stores therein the intensities of alpha1 and alpha3 with relating to the intensity of the power to be supplied to each circuit element, when the alpha1 and the alpha3 represent a first-order component linear to the input signal to the circuit element and a third-order component non-linear to the input signal, contained in the output signal from the circuit element, respectively, and the alpha1 is more than zero and the alpha3 is less the zero, and
the relation deriving unit derives the relation between the intensity of the power to be supplied to each circuit element and the intensity of the interference noise, on the basis of the alpha1 and the alpha3 stored in the circuit characteristic storage unit, the intermodulation distortion IM3 given by the following Expression 2, the cross-modulation distortion N given by the following Expression 3, and the difference between the intensity of the test noise measured by the test noise measuring unit and the intensity of the normal noise measured by the normal noise measuring unit, when the third-order input intercept point IIP3 of the circuit element is given by the following Expression 1, and A and Ain represent the respective intensities of a target wave and an interfering wave contained in the input signal to the circuit element:

$$IIP3 = \sqrt{\frac{4\alpha_1}{3|\alpha_3|}}$$ [Expression 1]

-continued $$IM3 = \frac{\alpha_1 A_{in}^3}{IIP3^2}$$ [Expression 2]

$$N = \frac{2\alpha_1 AA_{in}^2}{IIP3^2}.$$ [Expression 3]

11. The apparatus according to claim 6, wherein the relation deriving unit derives the relation between the intensity of the power to be supplied to each circuit element and the intensity of the noise contained in the output signal from the circuit element, on the basis of the difference between the intensity of the normal noise measured by the normal noise measuring unit and the intensity of the test noise measured by the test noise measuring unit, when the power supply unit supplies only one time the test power to the circuit element over the first time period.

12. The apparatus according to claim 6, wherein the apparatus further comprises a mean value calculating unit that calculates a mean value of the intensities of the test noise, each of which was measured by the test noise measuring unit in each of a plurality of time periods not overlapping each other, when the power supply unit supplies the test power to each circuit element over each of the plurality of time periods, and the relation deriving unit derives the relation between the intensity of the power to be supplied to each circuit element and the intensity of the noise contained in the output signal from the circuit element, on the basis of the difference between the mean value of the intensities of the noise calculated by the mean value calculating unit and the intensity of the noise measured by the normal noise measuring unit.

13. The apparatus according to claim 4, further comprising:
 a correcting unit that performs error correction processing to a signal output from the tuner;
 a supply condition determining unit that determines the intensity of the test noise and the first time period so that the error correcting unit can correct errors to be contained in the signal output from the tuner, due to the noise to be contained in the signal output from the tuner, when the test power is supplied to each circuit element over the first time period; and
 a power supply control unit that controls the power supply unit to supply the test power of the intensity determined by the supply condition determining unit, over the first time period determined by the supply condition determining unit.

14. The apparatus according to claim 13, wherein a signal to be input to the tuner is constituted by a plurality of symbols being temporarily successive, and
 the supply condition determining unit determines the intensity of the test noise and the first time period so that the error correcting unit can correct any symbol that contains errors due to the noise to be contained in the signal output from the tuner, when the test power is supplied to each circuit element over the first time period.

15. The apparatus according to claim 13, wherein a signal to be input to the tuner is constituted by a plurality of symbols being temporarily successive, and
 the supply condition determining unit determines the first time period so as to be within the time period of one symbol of the signal to be input to the tuner.

16. The apparatus according to claim 6, wherein the apparatus further comprises a retest noise measuring unit that instructs the power supply unit to supply to each circuit element the power of the intensity corresponding to the intensity of the critical power derived by the critical power deriving unit, and measures the intensity of the noise contained in the signal after channel select processing output from the tuner, and
 the power updating unit updates the intensity of the normal power to an intensity not less than the intensity of the critical power determined by the critical power deriving unit, and less than the normal power before updating, when the intensity of the noise measured by the retest noise measuring unit is not more than the noise permissible value.

17. The apparatus according to claim 6, wherein the normal noise measuring unit is provided in the demodulator.

18. The apparatus according to claim 4, wherein the power updating unit comprising:
 a noise improvement updating section that updates the intensity of the normal power to an intensity, which is in between the test power and the normal power and different from the normal power before updating, when the power supply unit supplies to each circuit element over the first time period the test power that brings about a reduction of the noise contained in the signal after channel select processing to be output from the tuner, in comparison with the noise when the power supply unit supplies the normal power to the circuit element, and the result of the comparison by the comparing unit indicates that the intensity of the test noise is not more than the noise reference value.

19. The apparatus according to claim 18, wherein the upper and lower limits of a noise stability region have been set as noise reference values, and
 the apparatus further comprises:
 a normal noise measuring unit that measures the intensity of normal noise contained in a signal after channel select processing to be output from the tuner, in a second time period different from the first time period, when the power supply unit supplies the normal power to each circuit element over the second time period; and
 an update selecting unit that causes the power reduction updating section to update the normal power when the intensity of the normal noise measured by the normal noise measuring unit is not more than the lower limit of the stability region, and causes the noise improvement updating section to update the normal power when the intensity of the normal noise measured by the normal noise measuring unit is not less than the upper limit of the stability region.

20. The apparatus according to claim 4, further comprising:
 a set value storage unit that stores therein a set value for power;
 an interference judging unit that judges whether or not a received signal of the tuner contains an interfering wave; and
 a set value power supply unit that stops the power updating unit to update the normal power and supplies to each circuit element the power having its intensity corresponding to the intensity of the set value stored in the set value storage section, when the interference judging section has decided that the received signal contains an interfering wave.

21. The apparatus according to claim 20, wherein the set value stored in the set value storage section has been adjusted to an intensity that brings about a reduction of the noise to be contained in the signal output from the tuner, due to the interfering wave contained in the received signal, when the power of the intensity of the set value is supplied to each circuit element.

22. The apparatus according to claim 20, wherein the apparatus further comprises an interference presence/absence signal outputting unit that outputs to the set value power supply unit an interference presence signal indicating that an interfering wave is contained, when the interference judging unit has decided that the received signal contains an interfering wave, and outputs to the set value power supply unit an interference absence signal indicating that no interfering wave is contained, when the interference judging unit has decided that the received signal contains no interfering wave, and the set value power supply unit stops the power updating unit to update the intensity of the normal power and continuously supplies to each circuit element the power having its intensity corresponding to the set value stored in the set value storage unit, in a time period during which the interference presence/absence signal outputting unit is outputting the interference presence signal, and then the set value power supply unit instructs the power supply unit to restart updating the intensity of the normal power, when the interference presence/absence signal outputting unit starts outputting the interference absence signal.

23. The apparatus according to claim 20, further comprising:
a default value storage unit that stores therein a default value for the normal power; and
a default updating unit that updates the intensity of the normal power to the default value stored in the default value storage unit, when the interference judging unit has decided that the received signal contains an interfering wave.

24. The apparatus according to claim 20, wherein the apparatus further comprises a check judging unit that performs a plurality of times of checks of the results of the judgment by the interference judging unit, at intervals of a predetermined time period, and judges whether or not the judgment result of the interference judging unit indicates in any of the plurality of times of checks that the received signal contains an interfering wave, and
the set value power supply unit stops the power updating unit to update the normal power and supplies to each circuit element the power having its intensity corresponding to the set value stored in the set value storage unit, only when the check judging unit has decided that the judgment result of the interference judging unit indicates in any of the plurality of times of checks that the received signal contains an interfering wave.

25. The apparatus according to claim 20, wherein the apparatus further comprises a check judging unit that performs a plurality of times of checks of the results of the judgment by the interference judging unit, at intervals of a predetermined time period, and judges whether or not the judgment result of the interference judging unit indicates in at least one of the plurality of times of checks that the received signal contains an interfering wave, and
the set value power supply unit stops the power updating unit to update the normal power and supplies to each circuit element the power having its intensity corresponding to the set value stored in the set value storage unit, only when the check judging unit has decided that the judgment result of the interference judging unit indicates in at least one of the plurality of times of checks that the received signal contains an interfering wave.

26. The apparatus according to claim 20, further comprising:
a processor that serves as the power updating unit; and
an interrupt control unit that interrupts processing by the processor and inserts processing by the set power supply unit, when the interference judging unit has decided that the received signal contains an interfering wave.

27. A digital receiver comprising:
a digital demodulating apparatus; and
a reproduction processing unit that performs processing for reproducing at least one of characters, an image, a sound, and a data item, on the basis of a received signal from the digital demodulating apparatus,
the digital demodulating apparatus comprising:
a tuner constituted by a plurality of circuit elements to perform channel select processing;
a demodulator that performs demodulation processing to a signal output from the tuner;
a power supply unit that supplies a normal power to each circuit element, and supplies to the circuit element a test power different from the normal power, over a first time period in place of the normal power;
a test noise measuring unit that measures the intensity of test noise contained in a signal to be output from the tuner, when the power supply unit supplies the test power over the first time period;
a comparing unit that compares the intensity of the test noise measured by the test noise measuring unit with a noise reference value as a reference for updating of the normal power; and
a power updating unit that updates the intensity of the normal power on the basis of a result of the comparison by the comparing unit, wherein the power updating unit comprising:
a power reduction updating section that updates the intensity of the normal power to an intensity not less than the test power and less than the normal power when the power supply unit supplies to each circuit element the test power less than the normal power, over the first time period, and the result of the comparison by the comparing unit indicates that the intensity of the test noise is not more than the noise reference value.

28. A method of supplying a power to a digital demodulating apparatus comprising a tuner constituted by a plurality of circuit elements to perform channel select processing, and a demodulator that performs demodulation processing to a signal output from the tuner,
the method comprising:
a power supply step of supplying a normal power to each circuit element, and supplying to the circuit element a test power different from the normal power, over a first time period in place of the normal power;
a test noise measuring step of measuring the intensity of test noise contained in a signal to be output from the tuner, when the test power is supplied over the first time period in the power supply step;
a comparing step of comparing the intensity of the test noise measured in the test noise measuring step with a noise reference value as a reference for updating of the normal power; and
an power updating step of updating the intensity of the normal power on the basis of a result of the comparison in the comparing step; and
a power reduction updating step of updating the intensity of the normal power to an intensity not less than the test power and less than the normal power when the power supply step supplies to each circuit element the test power less than the normal power, over the first time period, and the result of the comparison in the comparing step indicates that the intensity of the test noise is not more than the noise reference value.

29. The method according to claim 28, further comprising:
an interference judging step of judging whether or not a received signal of the tuner contains an interfering wave; and
a set value power supply step of stopping the processing of the power updating step and supplying to each circuit element the power having its intensity set in advance, when it is decided in the interference judging step that the received signal contains an interfering wave.

30. A non-transitory computer-readable medium having instructions stored thereon for a digital demodulating apparatus, the digital demodulating apparatus comprising a tuner constituted by a plurality of circuit elements to perform channel select processing, and a demodulator that performs demodulation processing to a signal output from the tuner, wherein, when the instructions are read and executed by a processor, the processor is configured to perform the steps of
a power supply step of supplying a normal power to each circuit element, and supplying to the circuit element a test power different from the normal power, over a first time period in place of the normal power;
a test noise measuring step of measuring the intensity of test noise contained in a signal to be output from the tuner, when the test power is supplied over the first time period in the power supply step;
a comparing step of comparing the intensity of the test noise measured in the test noise measuring step with a noise reference value as a reference for updating of the normal power;
a power updating step of updating the intensity of the normal power on the basis of a result of the comparison in the comparing step; and
a power reduction updating step of updating the intensity of the normal power to an intensity not less than the test power and less than the normal power when the power supply step supplies to each circuit element the test power less than the normal power, over the first time period, and the result of the comparison in the comparing step indicates that the intensity of the test noise is not more than the noise reference value.

31. The non-transitory computer-readable medium according to claim 30, further comprising the steps of:
an interference judging step of judging whether or not a received signal of the tuner contains an interfering wave; and
a set value power supply step of stopping the processing of the power updating step and supplying to each circuit element the power having its intensity set in advance, when it is decided in the interference judging step that the received signal contains an interfering wave.

32. A non-transitory computer-readable medium having instructions stored thereon for a digital demodulating apparatus, the digital demodulating apparatus comprising a tuner constituted by a plurality of circuit elements to perform channel select processing, and a demodulator that performs demodulation processing to a signal output from the tuner, wherein, when the instructions are read and executed by a processor, the processor is configured to perform the steps of
a power supply step of supplying a normal power to each circuit element, and supplying to the circuit element a test power different from the normal power, over a first time period in place of the normal power;
a test noise measuring step of measuring the intensity of test noise contained in a signal to be output from the tuner, when the test power is supplied over the first time period in the power supply step;
a comparing step of comparing the intensity of the test noise measured in the test noise measuring step with a noise reference value as a reference for updating of the normal power; and
a power updating step of updating the intensity of the normal power on the basis of a result of the comparison in the comparing step; and
a power reduction updating step of updating the intensity of the normal power to an intensity not less than the test power and less than the normal power when the power supply step supplies to each circuit element the test power less than the normal power, over the first time period, and the result of the comparison in the comparing step indicates that the intensity of the test noise is not more than the noise reference value.

* * * * *